US012404126B2

(12) United States Patent
Shimokawa et al.

(10) Patent No.: US 12,404,126 B2
(45) Date of Patent: Sep. 2, 2025

(54) RECORDING MATERIAL CONVEYANCE APPARATUS, IMAGE FORMING SYSTEM, RECORDING MATERIAL CONVEYANCE METHOD, AND STORAGE MEDIUM

(71) Applicant: Konica Minolta, Inc., Tokyo (JP)

(72) Inventors: Syunji Shimokawa, Tokyo (JP); Hiroyuki Konishi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 175 days.

(21) Appl. No.: 18/335,295

(22) Filed: Jun. 15, 2023

(65) Prior Publication Data

US 2023/0406654 A1 Dec. 21, 2023

(30) Foreign Application Priority Data

Jun. 20, 2022 (JP) ................................ 2022-098510

(51) Int. Cl.
*B65H 3/44* (2006.01)
*B65H 5/26* (2006.01)
(Continued)

(52) U.S. Cl.
CPC ............... *B65H 3/44* (2013.01); *B65H 3/446* (2013.01); *B65H 5/26* (2013.01); *B65H 7/02* (2013.01);
(Continued)

(58) Field of Classification Search
CPC ... B65H 3/44; B65H 5/26; B65H 7/00; B65H 7/02; B65H 7/04; B65H 7/06; B65H 7/18;
(Continued)

(56) References Cited

U.S. PATENT DOCUMENTS 4,763,889 A * 8/1988 Dei .................... G03G 15/6508 271/9.03
2007/0047979 A1* 3/2007 Ai ...................... G03G 15/6508 399/23
(Continued)

FOREIGN PATENT DOCUMENTS

JP 2006-001233 1/2006

*Primary Examiner* — Prasad V Gokhale
(74) *Attorney, Agent, or Firm* — BakerHostetler

(57) ABSTRACT

A recording material conveyance apparatus includes a hardware processor and a measurement section. The hardware processor is capable of performing switching control of, in response to, among a plurality of recording material housing sections that house recording materials, a first recording material housing section becoming out of recording material while a recording material fed from the first recording material housing section is being conveyed, selecting a second recording material housing section to cause a recording material housed in the second recording material housing section to be conveyed. In the switching control, the hardware processor selects the second recording material housing section based on a measured physical property value of each of the recording materials of the recording material housing section The measurement section measures the physical property value of each of the recording materials of the recording material housing section. The physical property value corresponds to a physical property.

27 Claims, 20 Drawing Sheets

(51) Int. Cl.
*B65H 7/02* (2006.01)
*B65H 7/06* (2006.01)
*B65H 7/20* (2006.01)
*B65H 43/04* (2006.01)
*G03G 15/00* (2006.01)

(52) U.S. Cl.
CPC ................. *B65H 7/06* (2013.01); *B65H 7/20* (2013.01); *B65H 43/04* (2013.01); *G03G 15/5029* (2013.01); *G03G 15/6508* (2013.01); *B65H 2301/13* (2013.01); *B65H 2301/14* (2013.01); *B65H 2405/332* (2013.01); *B65H 2515/70* (2013.01); *B65H 2515/805* (2013.01); *B65H 2801/06* (2013.01)

(58) Field of Classification Search
CPC .. B65H 7/20; B65H 2301/13; B65H 2301/14; B65H 2401/20; B65H 2401/21; B65H 2511/10; B65H 2511/414; B65H 2511/416; B65H 2515/70; B65H 2515/805; B65H 2801/06; G03G 15/5029; G03G 15/6508
See application file for complete search history.

(56) References Cited

U.S. PATENT DOCUMENTS

2009/0261524 A1* 10/2009 Nakayama ............... B65H 3/44 726/19
2013/0099440 A1* 4/2013 Hikichi .................... B65H 7/20 271/9.06

* cited by examiner

FIG.3

121

| | PHYSICAL PROPERTY VALUE OF SHEET | |
|---|---|---|
| | SURFACE ELECTRICAL RESISTANCE (MΩ) | MOISTURE CONTENT (%) |
| FIRST SHEET FEED TRAY | 37 | 6 |
| SECOND SHEET FEED TRAY | 62 | 8 |
| THIRD SHEET FEED TRAY | 33 | 5 |
| FOURTH SHEET FEED TRAY | 40 | 6 |
| FIFTH SHEET FEED TRAY | 54 | 7 |
| SIXTH SHEET FEED TRAY | 30 | 5 |

FIG.4

122

| | FIRST THRESHOLD VALUE |
|---|---|
| SURFACE ELECTRICAL RESISTANCE (MΩ) | 10 |
| MOISTURE CONTENT (%) | 4 |

123

| | FIRST THRESHOLD VALUE | SECOND THRESHOLD VALUE | THIRD THRESHOLD VALUE | | FOURTH THRESHOLD VALUE |
|---|---|---|---|---|---|
| SURFACE ELECTRICAL RESISTANCE (MΩ) | 10 | 10 | 30 | IMAGE DENSITY | 0.22 |
| MOISTURE CONTENT (%) | 4 | 4 | 12 | | |

FIG.15A

124

| LEVEL | FIRST THRESHOLD VALUE | | IMAGE QUALITY REQUESTED BY CUSTOMER |
|---|---|---|---|
| | RESISTANCE | MOISTURE CONTENT | |
| 1 | 20 | 4 | LOW |
| 2 | 15 | 3 | MEDIUM |
| 3 | 10 | 2 | HIGH |

FIG.15B

125

| LEVEL | SECOND THRESHOLD VALUE | | IMAGE QUALITY REQUESTED BY CUSTOMER |
|---|---|---|---|
| | RESISTANCE | MOISTURE CONTENT | |
| 1 | 20 | 4 | LOW |
| 2 | 15 | 3 | MEDIUM |
| 3 | 10 | 2 | HIGH |

FIG.15C

126

| LEVEL | THIRD THRESHOLD VALUE | | IMAGE QUALITY REQUESTED BY CUSTOMER |
|---|---|---|---|
| | RESISTANCE | MOISTURE CONTENT | |
| 1 | 40 | 12 | LOW |
| 2 | 30 | 10 | MEDIUM |
| 3 | 20 | 8 | HIGH |

FIG.15D

127

| LEVEL | FOURTH THRESHOLD VALUE | IMAGE QUALITY REQUESTED BY CUSTOMER |
|---|---|---|
| 1 | 0.22 | LOW |
| 2 | 0.17 | MEDIUM |
| 3 | 0.12 | HIGH |

| SHEET ID | SHEET FEED TRAY | IMAGE DENSITY |
|---|---|---|
| 1 | FIRST SHEET FEED TRAY | 5.44 |
| 2 | FIRST SHEET FEED TRAY | 5.41 |
| 3 | SECOND SHEET FEED TRAY | 5.37 |

| SHEET ID | SHEET FEED TRAY | IMAGE DENSITY |
|---|---|---|
| 1 | FIRST SHEET FEED TRAY | 5.44 |
| 2 | FIRST SHEET FEED TRAY | 5.41 |
| 3 | SECOND SHEET FEED TRAY | 5.11 |

RECORDING MATERIAL CONVEYANCE APPARATUS, IMAGE FORMING SYSTEM, RECORDING MATERIAL CONVEYANCE METHOD, AND STORAGE MEDIUM

REFERENCE TO RELATED APPLICATIONS

This application claims priority to Japanese Patent Application No. 2022-098510 filed on Jun. 20, 2022, the disclosure of which is incorporated herein by reference in its entirety.

TECHNICAL FIELD

The present invention relates to a recording material conveyance apparatus, an image forming system, a recording material conveyance method, and a storage medium.

DESCRIPTION OF THE RELATED ART

There is disclosed in JP 2006-1233 A an image forming apparatus that, if a sheet feed tray is out of recording materials during image forming, selects another sheet feed tray on the basis of the size, paper type and weight of the recording materials, performs switching to the selected sheet feed tray to feed recording materials therefrom, and keeps image forming on the recording materials of the post-switching sheet feed tray, to which switching has been performed.

SUMMARY OF THE INVENTION

In the image forming apparatus disclosed in JP 2006-1233 A, even if the recording materials housed in the pre-switching sheet feed tray and the post-switching sheet feed tray are the same in size, paper type and weight, properties (surface electrical resistance, moisture content, etc.) of the recording materials may be different from one another due to the environment where they are housed. In such a case, even if printing conditions for image forming on the recording materials are the same, image densities of images formed thereon become different from one another. If image forming continues on the recording materials of the post-switching sheet feed tray, a stable image quality may not be obtained.

The present invention has been made in view of the above problem(s), and objects of the present invention include providing a recording material conveyance apparatus, an image forming system, a recording material conveyance method and a storage medium capable of making the image quality of an image formed on a recording material stable before and after switching of sheet feed trays.

To achieve at least one of the abovementioned objects, according to an aspect of the present invention, there is provided a recording material conveyance apparatus including: a hardware processor that (i) is capable of performing switching control of, in response to, among a plurality of recording material housing sections that house recording materials, a first recording material housing section becoming out of recording material while a recording material fed from the first recording material housing section is being conveyed, selecting a second recording material housing section to cause a recording material housed in the second recording material housing section to be conveyed, and (ii) in the switching control, selects the second recording material housing section based on a physical property value of each of the recording materials of the plurality of recording material housing sections; and a measurement section that measures the physical property value of each of the recording materials of the plurality of recording material housing sections, the physical property value corresponding to a physical property.

To achieve at least one of the abovementioned objects, according to another aspect of the present invention, there is provided an image forming system including: an image forming apparatus that forms images on the recording materials; and the above recording material conveyance apparatus.

To achieve at least one of the abovementioned objects, according to another aspect of the present invention, there is provided a recording material conveyance method including: performing switching control of, in response to, among a plurality of recording material housing sections that house recording materials, a first recording material housing section becoming out of recording material while a recording material fed from the first recording material housing section is being conveyed, selecting a second recording material housing section to cause a recording material housed in the second recording material housing section to be conveyed; and measuring a physical property value of each of the recording materials of the plurality of recording material housing sections, the physical property value corresponding to a physical property, wherein the switching control includes selecting the second recording material housing section based on the measured physical property value of each of the recording materials of the plurality of recording material housing sections.

To achieve at least one of the abovementioned objects, according to another aspect of the present invention, there is provided a non-transitory computer-readable storage medium storing a program that causes a recording material conveyance apparatus to: perform switching control of, in response to, among a plurality of recording material housing sections that house recording materials, a first recording material housing section becoming out of recording material while a recording material fed from the first recording material housing section is being conveyed, selecting a second recording material housing section to cause a recording material housed in the second recording material housing section to be conveyed; and measure a physical property value of each of the recording materials of the plurality of recording material housing sections, the physical property value corresponding to a physical property, wherein the switching control includes selecting the second recording material housing section based on the measured physical property value of each of the recording materials of the plurality of recording material housing sections.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 3 shows an example of content of a sheet feed tray information table;

FIG. 4 shows an example of content of a threshold value setting information table;

FIG. 15A shows an example of content of a first threshold value setting table;

FIG. 15B shows an example of content of a second threshold value setting table;

FIG. 15C shows an example of content of a third threshold value setting table;

FIG. 15D shows an example of content of a fourth threshold value setting table;

DETAILED DESCRIPTION

Hereinafter, embodiments of the present invention will be described in detail with reference to the drawings. However, the scope of the invention is not limited to the disclosed embodiments.

First Embodiment

1. Description of Configuration

Figure 1:
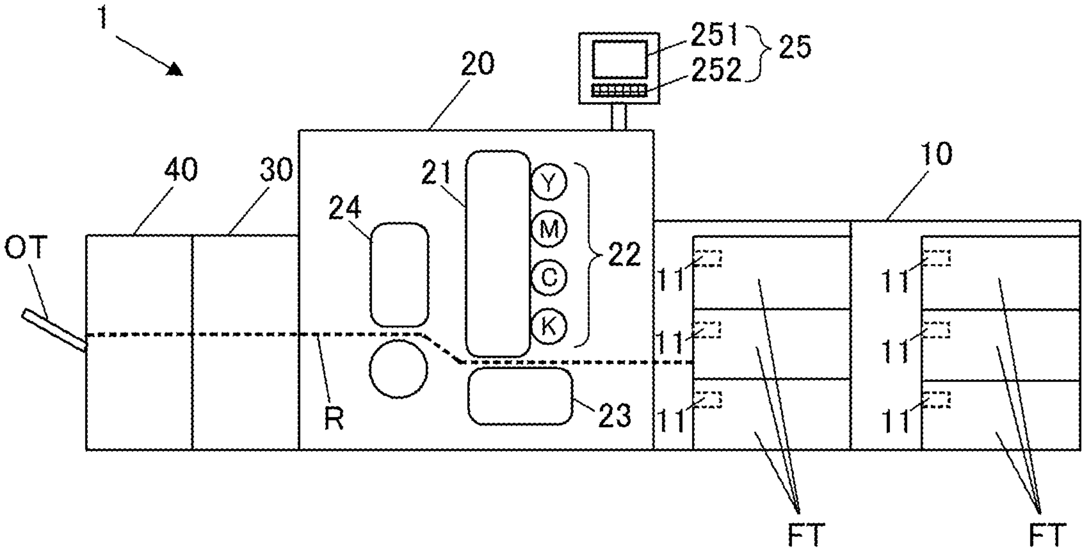
FIG. 1 is a diagram showing a schematic configuration of an image forming system of a first embodiment.

First, an image forming system 1 of a first embodiment will be described with reference to FIG. 1. FIG. 1 is a diagram showing a schematic configuration of the image forming system 1 of the first embodiment.

As shown in FIG. 1, the image forming system 1 of the first embodiment includes a sheet feed device 10, an image forming apparatus 20 connected to the rear stage of the sheet feed device 10, a relay unit 30 connected to the rear stage of the image forming apparatus and a finisher 40 connected to the rear stage of the relay unit 30.

The sheet feed device 10 is referred to as a paper feed unit (PFU). The sheet feed device 10 includes a plurality of sheet feed trays (recording material housing sections) FT and a sheet feed section including a sheet feed roller, a separation roller, sheet feed/separation rubber, and a sending roller. In each sheet feed tray FT, sheets (recording materials) of a type (paper type, basis weight, sheet size, and the like) are housed, and the sheets are conveyed one by one from the top to the image forming apparatus 20. In each sheet feed tray FT, a physical property measurement section 11 is disposed to measure physical property values that vary depending on the environment, such as surface electrical resistance and moisture content of the sheets. Each physical property measurement section 11 measures the above-described physical property values, for example, at the timing when a sheet(s) is housed in a sheet feed tray FT provided with the physical property measurement section 11. The physical property measurement section 11 associates data on the measured physical property values with the sheet feed tray FT housing the sheet, which is the measurement target, and outputs same to a controller 110 (hardware processor). Note that the physical property measurement section 11 may be capable of measuring physical property values such as smoothness, stiffness, paper type, basis weight and paper grain in addition to the surface electrical resistance and the moisture content described above. The measurement timing of the physical property values by the physical property measurement section 11 is not limited to the timing described above, and may be the timing at which a sheet is fed from the sheet feed tray FT.

The image forming apparatus 20 includes an endless intermediate transfer belt 21 that is stretched in a loop shape. The image forming apparatus 20 includes image forming sections 22 that are arranged along the intermediate transfer belt 21 and form toner images of colors of C (cyan), M (magenta), Y (yellow) and K (black). The image forming apparatus 20 includes a transfer section 23 that transfers the toner images (image) onto a sheet. The image forming apparatus 20 includes a fixing section 24 that fixes the transferred toner images (image) to the sheet. The image forming apparatus 20 forms a full-color toner image with the image forming sections 22 forming toner images of C, M, Y, K colors on the intermediate transfer belt 21 so as to be superimposed. The transfer section 23 transfers the full-color toner image formed on the intermediate transfer belt 21 to a sheet conveyed from the sheet feed device 10. The image forming apparatus 20 thermally fixes the toner image to the sheet in the fixing section 24, and then outputs the sheet to a subsequent-stage apparatus (here, the relay unit 30). The image forming apparatus 20 is not limited to the tandem electrophotographic system described above, and any system may be used to form images on sheets.

The image forming apparatus 20 includes an operation panel 25.

The operation panel 25 includes a display part 251 that displays various kinds of information for a user, and an operation part 252 that receives operation inputs from the user.

The display part 251 is constituted by a color liquid crystal display or the like, and displays an operation screen and the like (various setting screens, various buttons, an operation status of each function, and the like).

The operation part 252 includes a touch panel provided on the screen of the display part 251 and various hard keys arranged around the screen of the display part 251. The user can operate the operation part 252 to perform settings related to image forming, such as image quality setting, magnification setting, application setting, output setting and sheet setting, and make a sheet conveyance command, a stop operation of the apparatus, and the like.

The relay unit 30 relays and conveys a sheet output from the image forming apparatus 20 to a further subsequent-stage apparatus (here, the finisher 40). The relay unit 30 has a function of synchronizing with a conveyance speed of a sheet conveyed from the image forming apparatus 20.

The finisher 40 performs specified post-processing on the sheet sent from the relay unit 30 and then ejects the sheet to a sheet ejection tray OT.

Figure 2:
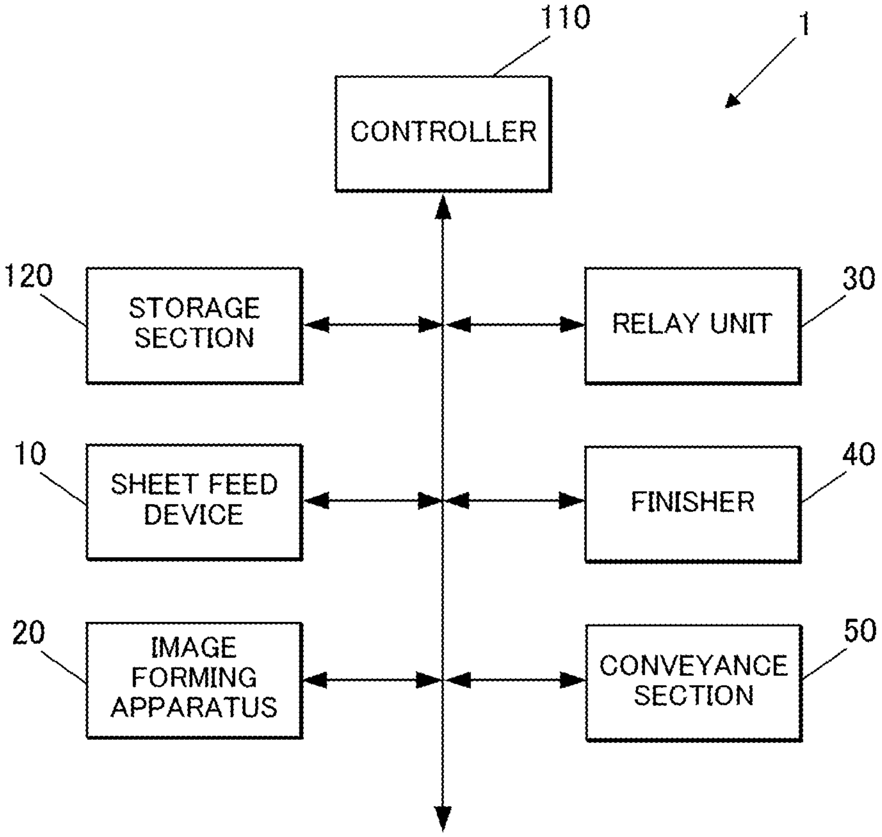
FIG. 2 is a block diagram schematically showing configuration of a control system of the image forming system of the first embodiment.

Next, a configuration of a control system of the image forming system 1 will be described with reference to FIG. 2. FIG. 2 is a block diagram schematically showing the configuration of the control system of the image forming system 1.

As shown in FIG. 2, the image forming system 1 includes the controller (hardware processor) 110, a storage section 120, the sheet feed device 10, the image forming apparatus 20, the relay unit 30, the finisher 40, and a conveyance section 50.

The controller 110 includes a central processing unit (CPU), a read only memory (ROM), and a memory.

The CPU reads various process programs stored in the ROM, and centrally controls operation of the components of the image forming system 1 in accordance with the programs.

The ROM is constituted by a nonvolatile semiconductor memory or the like, and stores various process programs, parameters and files required for execution of the programs, and the like.

The memory is constituted by a dynamic random-access memory (DRAM) or the like, and temporarily stores programs and various types of data, such as image data related to various types of image processing.

For example, while a sheet (recording material) fed from one sheet feed tray FT (first sheet feed tray) among the sheet feed trays FT is being conveyed, if sheets housed in the one sheet feed tray FT run out, the controller 110 performs switching control of selecting another sheet feed tray FT (second sheet feed tray) and causing the conveyance section 50 to convey a sheet housed in this another sheet feed tray FT. In the switching control, the controller 110 selects this another sheet feed tray FT on the basis of physical property values of sheets measured by the physical property measurement sections 11 and stored in a sheet feed tray information table 121 (described below) in association with their respective sheet feed trays FT housing the sheets as the measurement target.

The storage section 120 is a nonvolatile storage device such as a semiconductor memory or a hard disk drive (HDD) that stores various data such as programs and image data. The storage section 120 stores data such as program data and various setting data so as to be readable and writable from the controller 110.

Examples of the data stored in the storage section 120 include the sheet feed tray information table 121 and a threshold value setting information table 122.

FIG. 3 shows an example of content of the sheet feed tray information table 121.

As shown in FIG. 3, in the sheet feed tray information table 121, for each sheet feed tray FT, physical property values (surface electrical resistance and moisture content) of sheets housed in the sheet feed tray FT are recorded. Although not shown, in the sheet feed tray information table 121, for each sheet feed tray FT, data such as the size and the paper type of the sheets housed in the sheet feed tray FT are also recorded.

The physical property values for each sheet feed tray FT to be recorded in the sheet feed tray information table 121 are preferably measured/updated at an appropriate timing, for example, measured at the start of sheet feeding, measured regularly regardless of whether it is during sheet feeding, or measured about each sheet during sheet feeding. This makes it possible to, even in a case where one or more sheet feed trays have not been used for a while, switch a no-more-sheet tray where no sheet is housed any more to another tray with high accuracy by reflecting the state of a sheet of the current tray, without being affected by change in the state of sheets due to the environment.

FIG. 4 shows an example of content of the threshold value setting information table 122.

As shown in FIG. 4, in the threshold value setting information table 122, threshold values (first threshold value) for the surface electrical resistance and the moisture content, which are the physical property values of sheets, are recorded.

The conveyance section (recording material conveyance section) 50 includes a plurality of conveyance rollers (not shown) provided on a conveyance path R from the sheet feed device 10 to the finisher 40, and a drive section (not shown) for driving the conveyance rollers. The drive section is constituted by a stepping motor, for example, and is driven on the basis of a drive signal fed from the controller 110.

2. Description of Operation

Figure 5:
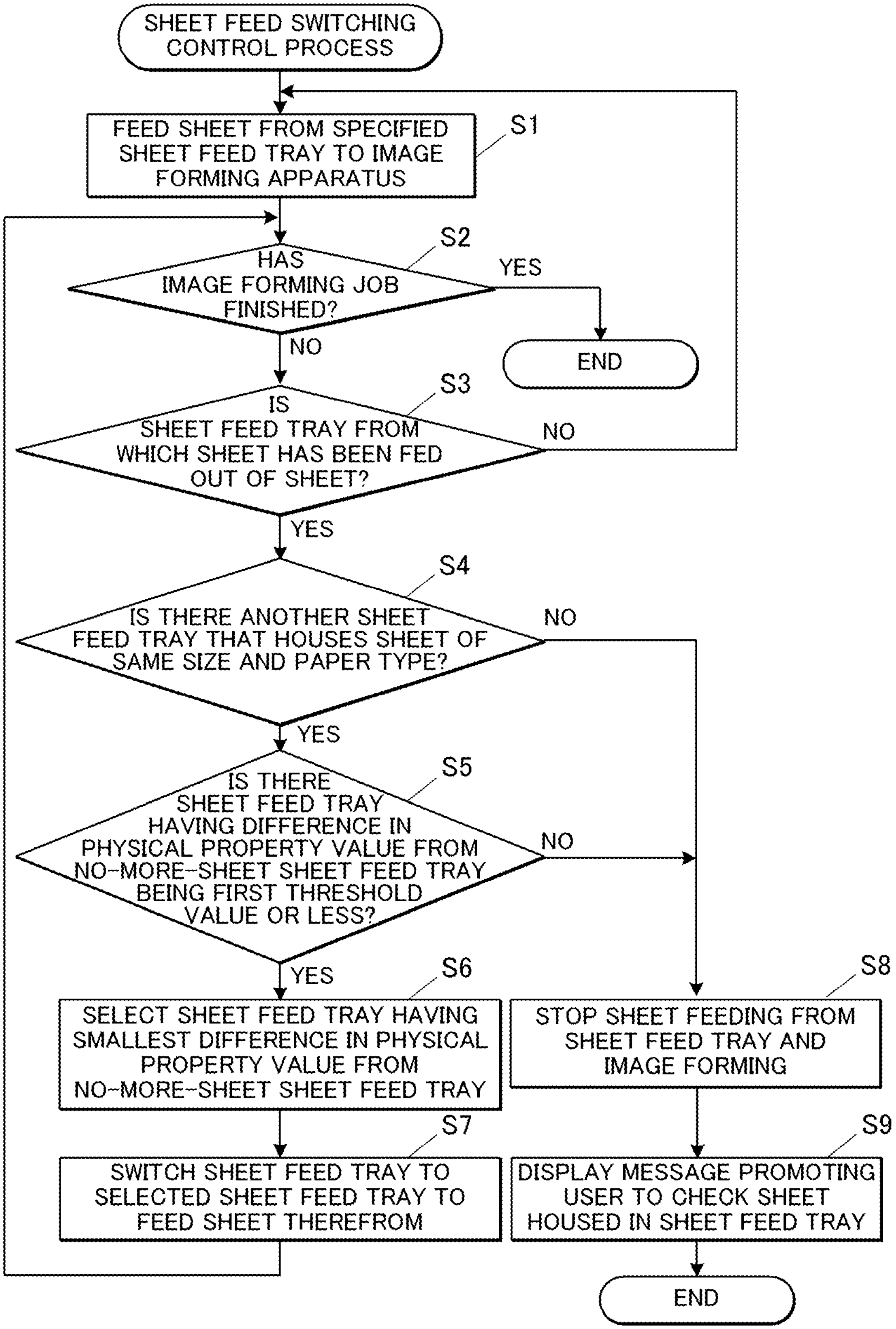
FIG. 5 is a flowchart showing a sheet feed switching control process.

Next, operation of the image forming system 1 will be described. FIG. 5 is a flowchart showing a sheet feed switching control process that is performed by the image forming system 1. This sheet feed switching control process is started, for example, in response to a command to execute an image forming job being made through the operation part 252.

As shown in FIG. 5, when the sheet feed switching control process is started, first, the controller 110 causes a sheet to be fed from a specified sheet feed tray FT to the image forming apparatus 20 (Step S1).

Next, the controller 110 determines whether the image forming job, for which the execution command has been made, has finished (Step S2).

If the controller 110 determines in Step S2 that the image forming job, for which the execution command has been made, has finished (Step S2; YES), the controller 110 ends the sheet feed switching control process.

If the controller 110 determines in Step S2 that the image forming job, for which the execution command has been made, has not finished (Step S2; NO), the controller 110 determines whether sheets in the sheet feed tray FT from which the sheet has been fed have run out (Step S3).

If the controller 110 determines in Step S3 that sheets in the sheet feed tray FT, from which the sheet has been fed, have not run out (Step S3; NO), the controller 110 returns the process to Step S1 to repeat Step S1 and the subsequent steps.

If the controller 110 determines in Step S3 that sheets in the sheet feed tray FT, from which the sheet has been fed, have run out (Step S3; YES), the controller 110 determines whether there is another sheet feed tray(s) FT that houses sheets of the same size and paper type, referring to the sheet feed tray information table 121 (Step S4).

If the controller 110 determines in Step S4 that there is another sheet feed tray(s) FT that houses sheets of the same size and paper type (Step S4; YES), the controller 110 determines whether or not the sheet feed tray(s) FT that houses sheets of the same size and paper type is/include a sheet feed tray(s) FT having a difference in physical property value (physical property value of a sheet) from the no-more-sheet sheet feed tray FT, in which sheets have run out, being the first threshold value or less, referring to the sheet feed tray information table 121 and the threshold value setting information table 122 (Step S5).

If the controller 110 determines in Step S5 that the sheet feed tray(s) FT that houses sheets of the same size and paper type is/include a sheet feed tray(s) FT having a difference in physical property value from the no-more-sheet sheet feed tray FT being the first threshold value or less (Step S5; YES), the controller 110 selects a sheet feed tray FT having the smallest difference from among the sheet feed tray(s) FT having the difference in physical property value from the no-more-sheet sheet feed tray FT being the first threshold value or less (Step S6).

Next, the controller 110 performs switching to the sheet feed tray FT selected in Step S6, that is, sets the selected sheet feed tray FT as a newly specified sheet feed tray FT, and causes a sheet to be fed from the sheet feed tray FT (Step S7). Then, the controller 110 returns the process to Step S2 to repeat Step S2 and the subsequent steps.

If the controller 110 determines in Step S4 that there are no other sheet feed trays FT that house sheets of the same size and paper type (Step S4; NO), the controller 110 stops sheet feeding from the sheet feed tray FT and image forming in the image forming apparatus 20 (Step S8).

If the controller 110 determines in Step S5 that the sheet feed tray(s) FT that houses sheets of the same size and paper type is not/do not include a sheet feed tray FT having a difference in physical property value from the no-more-sheet sheet feed tray FT being the first threshold value or less (Step S5; NO), the controller 110 stops sheet feeding from the sheet feed tray FT and image forming in the image forming apparatus 20 (Step S8).

Figure 6A:
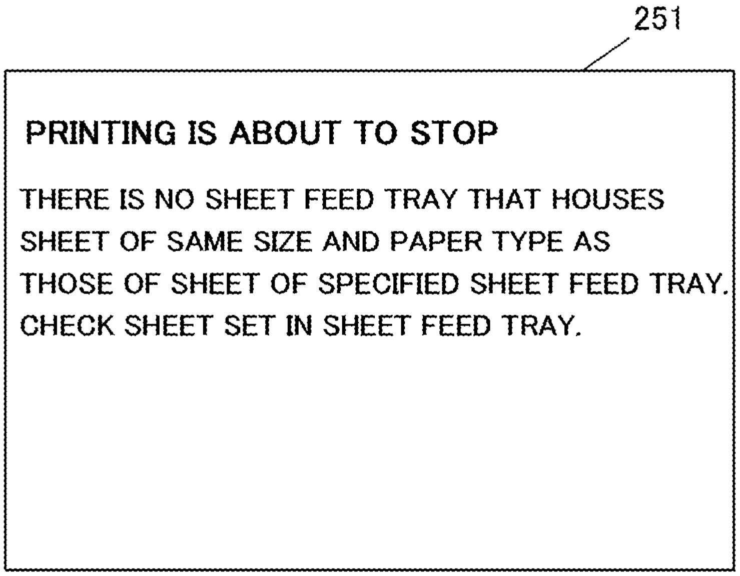
FIG. 6A shows a display example of a message prompting a user to check sheets housed in sheet feed trays.
Figure 6B:
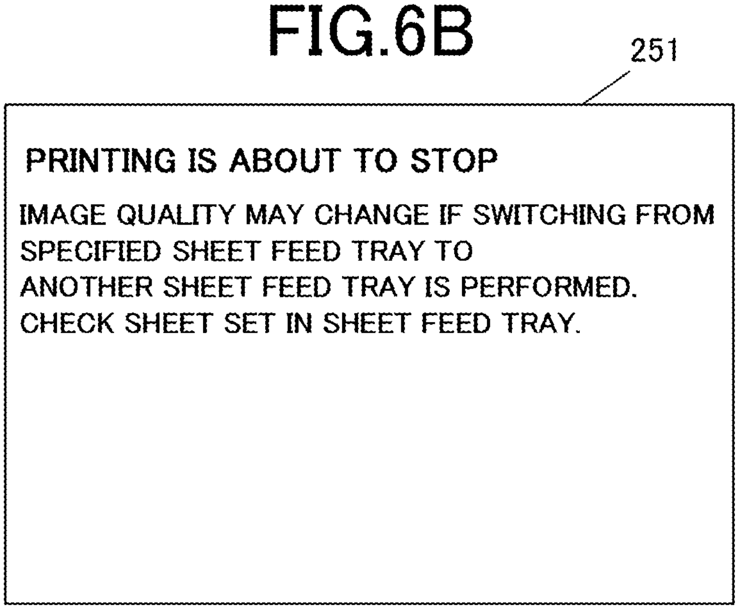
FIG. 6B shows a display example of the message prompting a user to check sheets housed in sheet feed trays.

Next, the controller 110 causes the display part 251 to display a message prompting the user to check sheets housed in sheet feed trays FT (Step S9). Specifically, if the controller 110 determines in Step S4 that there are no other sheet feed trays FT that house sheets of the same size and paper type (Step S4; NO), the controller 110 causes the display part 251 to display a message of "There is no sheet feed tray that houses sheet of same size and paper type as those of sheet of specified sheet feed tray. Check sheet set in sheet feed tray." as shown in FIG. 6A. If the controller 110 determines in Step S5 that the sheet feed tray(s) FT that houses sheets of the same size and paper type is not/do not include a sheet feed tray FT having a difference in physical property value from the no-more-sheet sheet feed tray FT being the first threshold value or less (Step S5; NO), the controller 110 causes the display part 251 to display a message of "Image quality may change if switching from specified sheet feed tray to another sheet feed tray is performed. Check sheet set in sheet feed tray." as shown in FIG. 6B. Then, the controller 110 ends the sheet feed switching control process.

Figure 7:
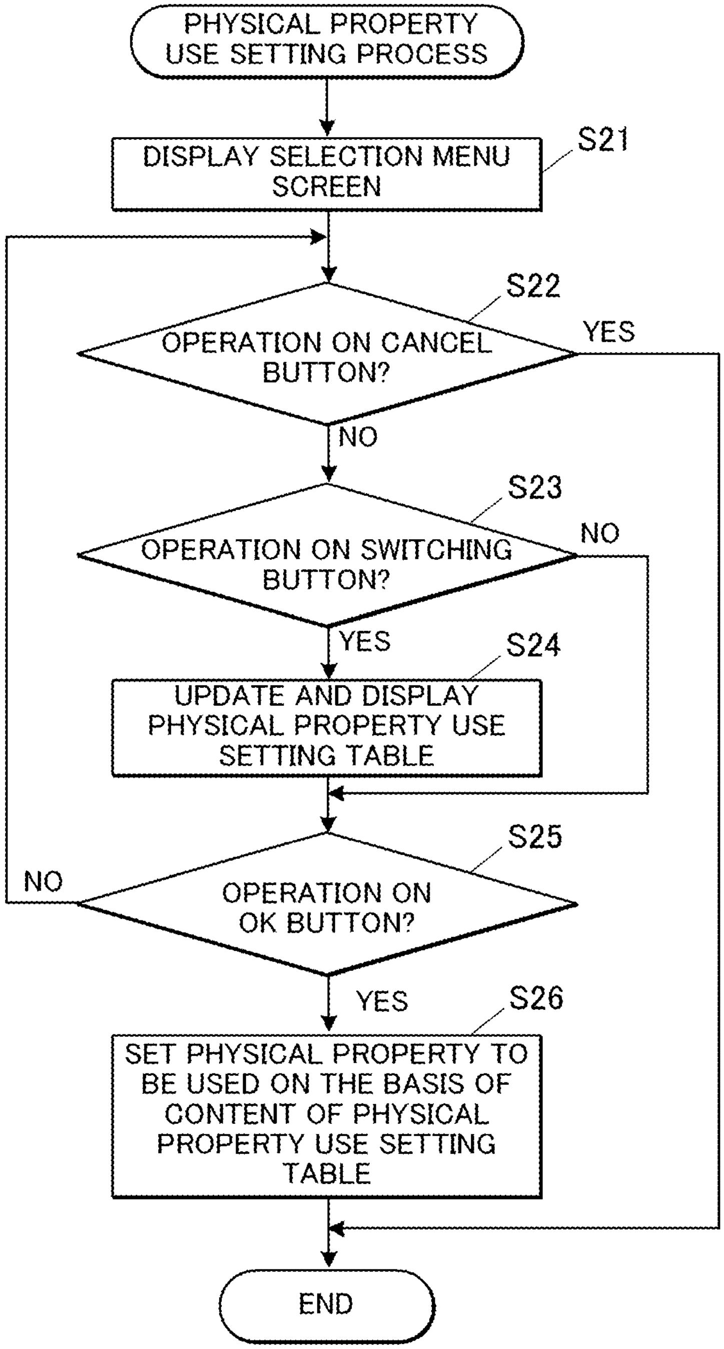
FIG. 7 is a flowchart showing a physical property use stetting process.

Next, a physical property use setting process that is performed by the image forming system 1 will be described with reference to FIG. 7. FIG. 7 is a flowchart showing the physical property use setting process. The physical property use setting process is a process for setting a physical property(ies) to be used for determining whether to switch sheet feed trays FT in the above-described sheet feed switching control process (shown in FIG. 5). The physical property use setting process is started, for example, in response to a command to execute setting of the physical property to be used being made through the operation part 252.

As shown in FIG. 7, when the physical property use setting process is started, first, the controller 110 causes the display part 251 to display a selection menu screen 61 (Step S21).

Figure 8A:
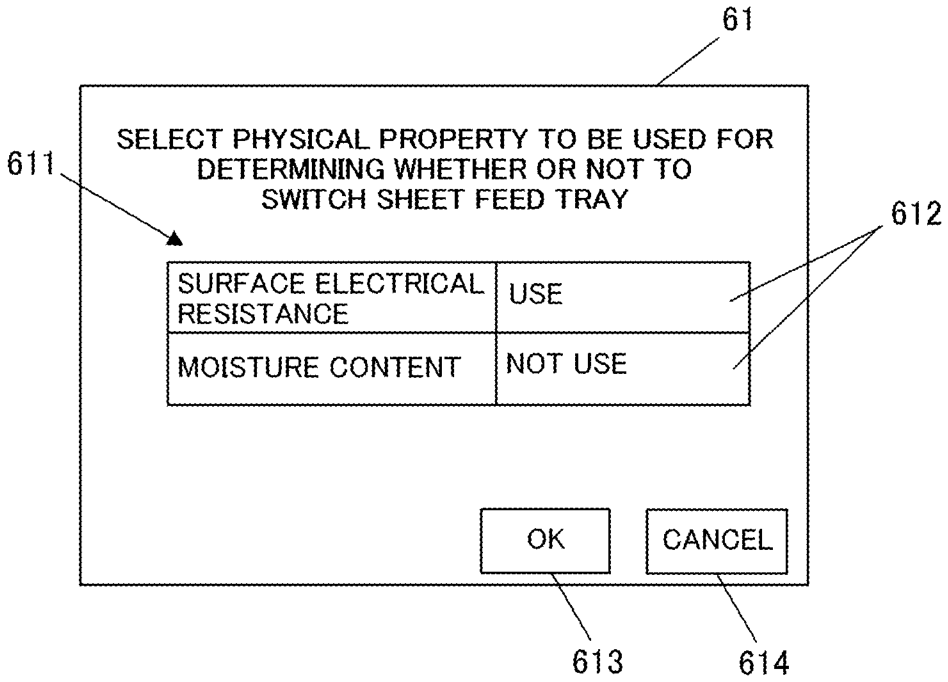
FIG. 8A shows an example of a selection menu screen.

FIG. 8A shows an example of the selection menu screen 61.

As shown in FIG. 8A, the selection menu screen 61 is provided with a physical property use setting table 611, an OK button 613, and a cancel button 614. The physical property use setting table 611 is a table for setting the physical property to be used for determining whether or not to switch sheet feed trays FT, and in the example shown in FIG. 8A, the surface electrical resistance is set to be used for determining whether or not to switch sheet feed trays FT, and the moisture content is set not to be used for determining whether or not to switch sheet feed trays FT. In the physical property use setting table 611, sections where words "use" and "not use" are displayed are switching buttons 612. When a switching button 612 with the word "use" displayed is operated, the "use" is switched to the "not use". When a switching button 612 with the words "not use" displayed is operated, the "not use" is switched to the "use". The OK button 613 is a button used for determining (fixing) the physical property to be used with the content displayed in the physical property use setting table 611. The cancel button 614 is a button used for closing the selection menu screen 61.

Returning to the description of the physical property use setting process shown in FIG. 7, the controller 110 determines whether an operation of selecting the cancel button 614 has been made (Step S22).

If the controller 110 determines in Step S22 that an operation of selecting the cancel button 614 has been made (Step S22; YES), the controller 110 ends the physical property use setting process.

If the controller 110 determines in Step S22 that an operation of selecting the cancel button 614 has not been made (Step S22; NO), the controller 110 determines whether an operation of selecting a switching button(s) 612 has been made (Step S23).

Figure 8B:
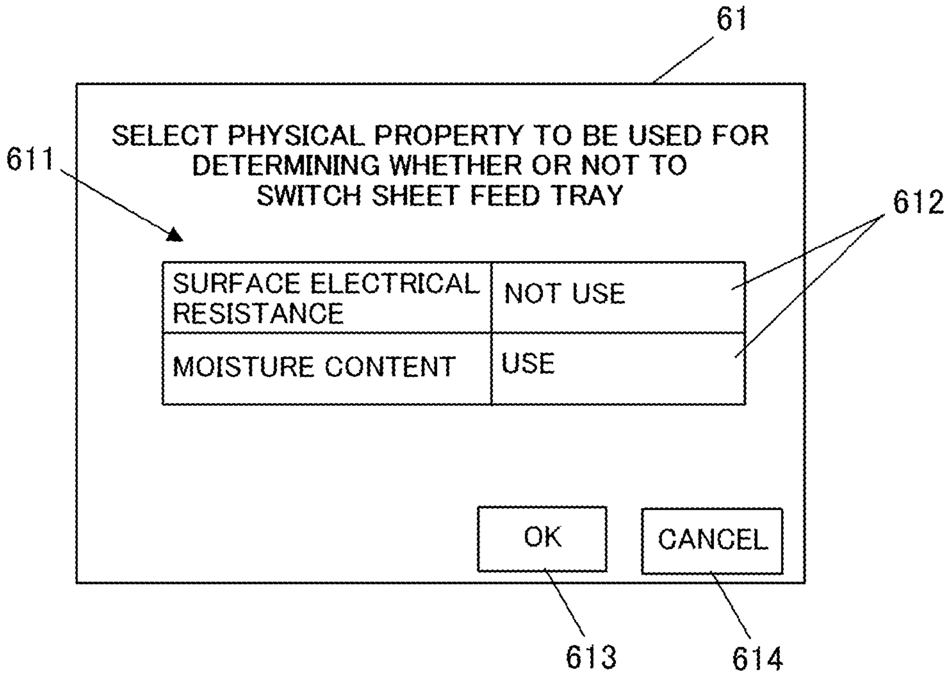
FIG. 8B shows an example of the selection menu screen.

If the controller 110 determines in Step S23 that an operation of selecting a switching button(s) 612 has been made (Step S23; YES), the controller 110 updates the using property setting table 611 and displays the updated one (Step S24). For example, in the physical property use setting table 611 shown in FIG. 8A, when the switching button 612 for the surface electrical resistance is operated to change the surface electrical resistance from "use" to "not use", and the switching button 612 for the moisture content is operated to change the moisture content from "not use" to "use", the physical property use setting table 611 is updated and displayed as shown in FIG. 8B. The physical property to be used for determining whether or not to switch sheet feed trays FT is not limited to one of the surface electrical resistance and the moisture content, and may be both the surface electrical resistance and the moisture content.

If the controller 110 determines in Step S23 that an operation of selecting a switching button(s) 612 has not been made (Step S23; NO), the controller 110 advances the process to Step S25, skipping Step S24.

Next, the controller 110 determines whether an operation of selecting the OK button 613 has been made (Step S25).

If the controller 110 determines in Step S25 that an operation of selecting the OK button 613 has been made (Step S25; YES), the controller 110 sets the physical property to be used for determining whether or not to switch sheet feed trays FT on the basis of the content displayed in the physical property use setting table 611 (Step S26). Information on the set physical property to be used is stored in the storage section 120. Then, the controller 110 ends the physical property use setting process.

If the controller 110 determines in Step S25 that an operation of selecting the OK button 613 has not been made (Step S25; NO), the controller 110 returns the process to Step S22 to repeat Step S22 and the subsequent steps.

3. Description of Modification Example (First Modification Example)

Figure 9:
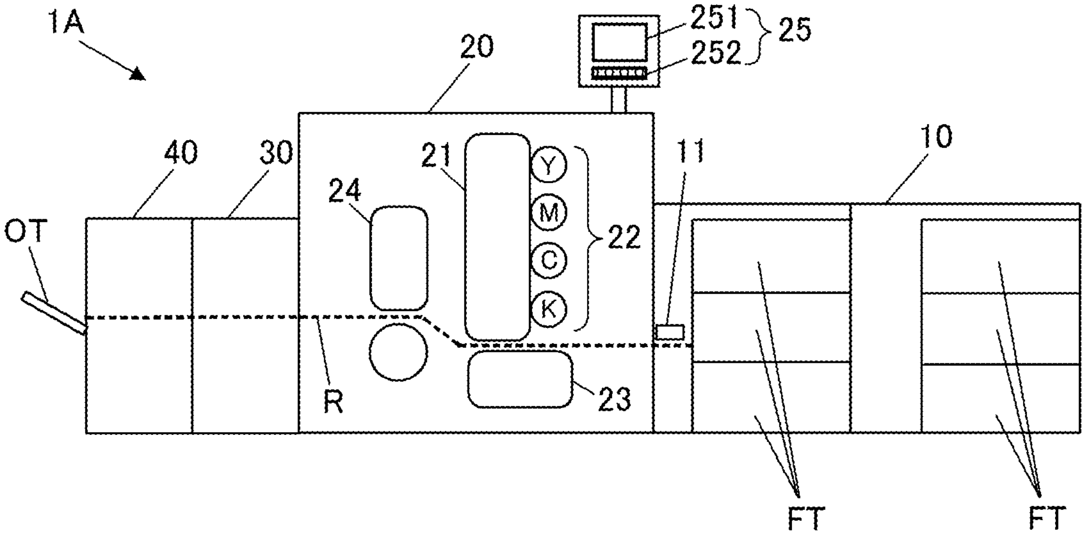
FIG. 9 is a diagram showing a schematic configuration of an image forming system of a first modification example.

Next, an image forming system 1A of a first modification example will be described with reference to FIG. 9. FIG. 9 is a diagram showing a schematic configuration of the image forming system 1A of the first modification example.

As shown in FIG. 9, the image forming system 1A of the first modification example (hereinafter, simply referred to as the image forming system 1A) is characterized in that a physical property measurement section 11 is provided on the conveyance path R in front of (on the upstream side of or before) the image forming apparatus 20. The image forming system 1A performs sheet passing of sheets housed in the sheet feed trays FT before (prior to) image forming to perform physical property measurement of the sheets with the physical property measurement section 11 provided on the conveyance path R in front of the image forming apparatus 20, and records the measured physical property values in the sheet feed tray information table 121 (shown in FIG. 3) in association with their respective sheet feed trays FT.

The image forming system 1A is the same as that described in the first embodiment except that the physical property measurement section 11 is provided on the conveyance path R in front of the image forming apparatus 20 as described above. Hence, description of the configuration of the system will be omitted, and operation of the system will be described.

Figure 10:
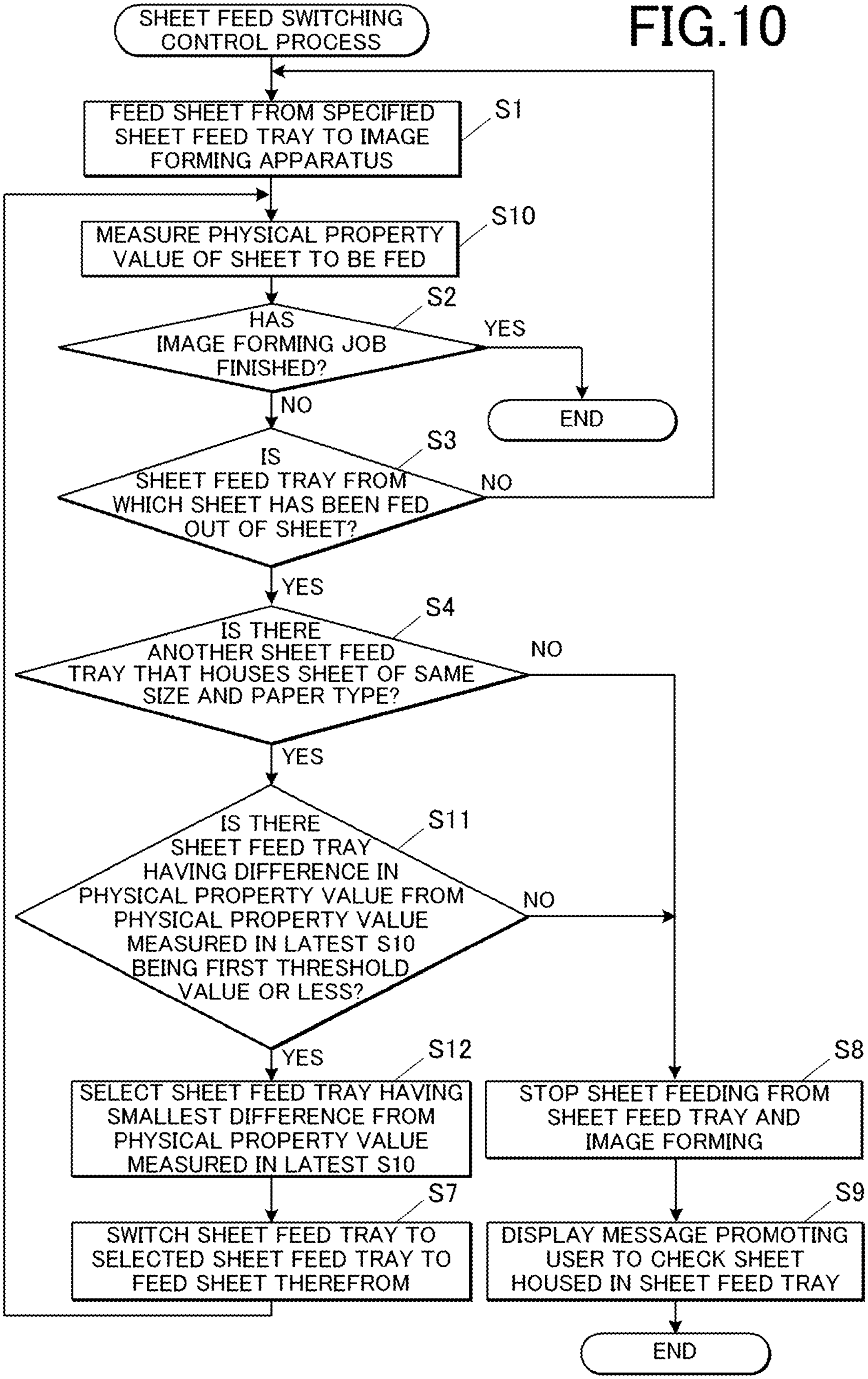
FIG. 10 is a flowchart showing the sheet feed switching control process of the first modification example.

FIG. 10 is a flowchart showing the sheet feed switching control process that is performed by the image forming system 1A. Note that, of this sheet feed switching control process shown in FIG. 10, steps same as those of the sheet feed switching control process shown in FIG. 5 are denoted by the same step numbers, and steps unique thereto are denoted by new step numbers.

As shown in FIG. 10, when the sheet feed switching control process is started, first, the controller 110 causes a sheet to be fed from a specified sheet feed tray FT to the image forming apparatus 20 (Step S1).

Next, the controller 110 causes the physical property measurement section 11 to measure a physical property value(s) of the sheet to be fed to the image forming apparatus 20 (Step S10). Specifically, the physical property measurement section 11 measures the physical property value of the sheet fed from the sheet feed tray FT and conveyed on the conveyance path R thereto.

Next, the controller 110 determines whether the image forming job, for which the execution command has been made, has finished (Step S2).

If the controller 110 determines in Step S2 that the image forming job, for which the execution command has been made, has finished (Step S2; YES), the controller 110 ends the sheet feed switching control process.

If the controller 110 determines in Step S2 that the image forming job, for which the execution command has been made, has not finished (Step S2; NO), the controller 110 determines whether sheets in the sheet feed tray FT from which the sheet has been fed have run out (Step S3).

If the controller 110 determines in Step S3 that sheets in the sheet feed tray FT, from which the sheet has been fed, have not run out (Step S3; NO), the controller 110 returns the process to Step S1 to repeat Step S1 and the subsequent steps.

If the controller 110 determines in Step S3 that sheets in the sheet feed tray FT, from which the sheet has been fed, have run out (Step S3; YES), the controller 110 determines whether there is another sheet feed tray(s) FT that houses sheets of the same size and paper type, referring to the sheet feed tray information table 121 (Step S4).

If the controller 110 determines in Step S4 that there is another sheet feed tray(s) FT that houses sheets of the same size and paper type (Step S4; YES), the controller 110 determines whether or not the sheet feed tray(s) FT that houses sheets of the same size and paper type is/include a sheet feed tray(s) FT having a difference in physical property value (physical property value of a sheet) from that measured in the latest Step S10 being the first threshold value or less, referring to the sheet feed tray information table 121 and the threshold value setting information table 122 (Step S11).

If the controller 110 determines in Step S11 that the sheet feed tray(s) FT that houses sheets of the same size and paper type is/include a sheet feed tray(s) FT having a difference in physical property value from that measured in the latest Step S10 being the first threshold value or less (Step S11; YES), the controller 110 selects a sheet feed tray FT having the smallest difference from among the sheet feed tray(s) FT having the difference in physical property value from that measured in the latest Step S10 being the first threshold value or less (Step S12).

Next, the controller 110 performs switching to the sheet feed tray FT selected in Step S12, that is, sets the selected sheet feed tray FT as a newly specified sheet feed tray FT, and causes a sheet to be fed from the sheet feed tray FT (Step S7). Then, the controller 110 returns the process to Step S10 to repeat Step S10 and the subsequent steps.

If the controller 110 determines in Step S4 that there are no other sheet feed trays FT that house sheets of the same size and paper type (Step S4; NO), the controller 110 stops sheet feeding from the sheet feed tray FT and image forming in the image forming apparatus 20 (Step S8).

If the controller 110 determines in Step S11 that the sheet feed tray(s) FT that houses sheets of the same size and paper type is not/do not include a sheet feed tray FT having a difference in physical property value from that measured in the latest Step S10 being the first threshold value or less (Step S11; NO), the controller 110 stops sheet feeding from the sheet feed tray FT and image forming in the image forming apparatus 20 (Step S8).

Next, the controller 110 causes the display part 251 to display a message prompting the user to check sheets housed in sheet feed trays FT (Step S9). Then, the controller 110 ends the sheet feed switching control process.

4. Description of Modification Example (Second Modification Example)

Figure 11:
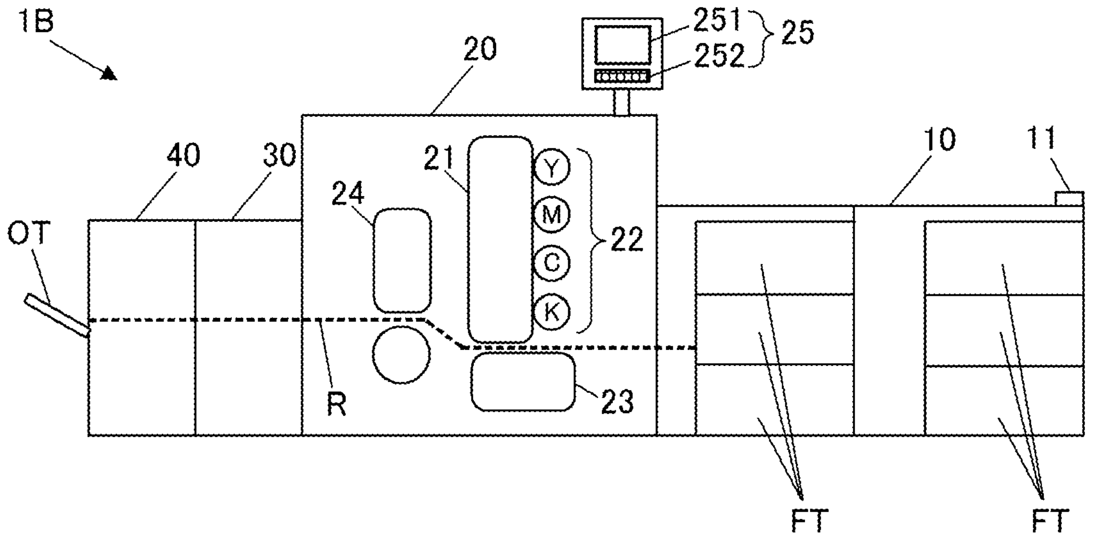
FIG. 11 is a diagram showing a schematic configuration of an image forming system of a second modification example.

Next, an image forming system 1B of a second modification example will be described with reference to FIG. 11. FIG. 11 is a diagram showing a schematic configuration of the image forming system 1B of the second modification example.

As shown in FIG. 11, the image forming system 1B of the second modified example (hereinafter, simply referred to as the image forming system 1B) is characterized in that a physical property measurement section 11 is externally attached to the system 1B. The image forming system 1B performs, when sheets are to be housed in their respective sheet feed trays FT, physical property measurement of the sheets with the physical property measurement section 11 externally attached to the image forming system 1B, and records the measured physical property values in the sheet feed tray information table 121 (shown in FIG. 3) in association with their respective sheet feed trays FT.

It is desirable to record a date and time on/at which the externally attached physical property measurement section 11 performs physical property measurement. If, at the time of the switching control, a predetermined time or more has elapsed since the recorded date and time of a physical property value(s) about a sheet feed tray FT, the sheet feed tray FT can be excluded from the selection. This makes it possible to prevent the problem that the image quality changes due to a sheet feed tray FT housing sheets the state of which may have changed.

The image forming system 1B is the same as that described in the first embodiment except that the physical property measurement section 11 is externally attached to the system 1B as described above. Hence, description of the configuration of the system will be omitted. Further, the sheet feed switching control process that is performed by the image forming system 1B is the same as the sheet feed switching control process (shown in FIG. 5) that is performed by the image forming system 1 of the first embodiment. Hence, description thereof will be omitted as well.

5. Advantageous Effects

As described above, the controller 110 of the image forming system 1 selects another sheet feed tray FT as the switching destination (second sheet feed tray) in the sheet feed switching control process (shown in FIG. 5). At the time, the controller 110 selects the second sheet feed tray FT on the basis of the physical property values of sheets measured by the physical property measurement sections 11 and stored in the sheet feed tray information table 121 in association with their respective sheet feed trays FT that house the sheets as the measurement target.

Hence, when selecting the second sheet feed tray FT, the controller 110 can select a sheet feed tray FT housing sheets having a physical property value(s) close to that (those) of a sheet(s) formerly housed in the pre-switching sheet feed tray FT (first sheet feed tray) as the second sheet feed tray FT. Therefore, it is possible to reduce a possibility that image densities of images formed on sheets before and after switching of sheet feed trays FT become different from one another. This can make the image quality of an image formed on a sheet stable before and after switching of sheet feed trays FT.

The image forming system 1 measures, with the physical property measurement sections 11, the physical property values of surface electrical resistance and moisture content of sheets, the physical property values thereof varying depending on the environment.

The controller 110 selects the second sheet feed tray FT, taking account of the aforementioned physical property values, which tend to affect image densities of images formed on sheets. Therefore, it is possible to further reduce the possibility that image densities of images formed on sheets before and after switching of sheet feed trays FT become different from one another. This can make the image quality of an image formed on a sheet more stable before and after switching of sheet feed trays FT.

As described above, the controller 110 of the image forming system 1 selects the second sheet feed tray FT. At the time, the controller 110 selects, from among sheet feed trays FT housing sheets of the same size and type as the sheet formerly housed in the first sheet feed tray FT, one or more sheet feed trays FT housing sheets having a difference in physical property value from the sheet formerly housed in the first sheet feed tray FT being the first threshold value or less, and select, from among these sheet feed trays FT, a sheet feed tray FT having the smallest difference as the second sheet feed tray FT.

Hence, when selecting the second sheet feed tray FT, the controller 110 can select a sheet feed tray FT housing sheets similar to the sheet formerly housed in the first sheet feed tray FT as the second sheet feed tray FT. Therefore, it is possible to further reduce the possibility that image densities of images formed on sheets before and after switching of sheet feed trays FT become different from one another. This can make the image quality of an image formed on a sheet more stable before and after switching of sheet feed trays FT.

As described above, the controller 110 of the image forming system 1 selects the second sheet feed tray FT. However, there may be no sheet feed tray FT housing sheets of the same size and type as the sheet formerly housed in the first sheet feed tray FT and having a difference in physical property value from the sheet formerly housed in the first sheet feed tray FT being the first threshold value or less. In such a case, the controller 110 does not select the second sheet feed tray FT and stops sheet conveyance by the conveyance section 50.

Thus, if there is no sheet feed tray FT housing sheets similar to the sheet formerly housed in the first sheet feed tray FT when the second sheet feed tray FT is to be selected, the controller 110 does not select the second sheet feed tray FT and stops sheet conveyance by the conveyance section 50. Therefore, it is possible to prevent image densities of images formed on sheets before and after switching of sheet feed trays FT from being different from one another.

The controller 110 of the image forming system 1 uses at least one item that corresponds to a physical property selected by a user operation(s) on the selection menu screen 61 (shown in FIG. 8) to select the second sheet feed tray FT.

Hence, the controller 110 can select the second sheet feed tray FT on the basis of the physical property desired by the user. Therefore, it is possible to increase usability in selection of the second sheet feed tray FT.

If the controller 110 of the image forming system 1 does not select the second sheet feed tray FT and stops sheet conveyance by the conveyance section 50, the controller 110 causes the display part 251 to display a message (information) prompting the user to check sheets housed in sheet feed trays FT. This allows the user to know that the second sheet feed tray FT is not selected.

The image forming system 1A of the first modification example includes the physical property measurement section 11 provided on the conveyance path R in front of the image forming apparatus 20.

Hence, the physical property measurement section 11 measures a physical property value(s) of a sheet(s) formerly housed in the first sheet feed tray FT at the timing when the sheet reaches the physical property measurement section 11. Therefore, when selecting the second sheet feed tray FT, the controller 110 can select the second sheet feed tray FT by comparing the current state of the sheet formerly housed in the first sheet feed tray FT with physical property values of sheets housed in other sheet feed trays FT.

The image forming system 1B of the second modification example includes the physical property measurement section 11 externally attached to the system 1B.

Hence, even an existing image forming system can perform the above-described sheet feed switching control process (shown FIG. 5) with the physical property measuring unit 11 connected thereto, like the image forming system 1B of the second modification example.

6. Others

Although the first embodiment to which the present invention is applied has been described above, those described in the above embodiment are not limitations but some of preferred examples of the present invention.

For example, in the above embodiment, the physical property(ies) that is used for determining whether or not to switch sheet feed trays FT is at least one of the surface electrical resistance and the moisture content, but another physical property(ies) may be used in addition to or instead of the physical property(ies).

Further, in the above embodiment, the first threshold value that is used for determining whether to switch sheet feed trays FT may be set/changed through the operation panel 25.

Second Embodiment

1. Description of Configuration

Figure 12:
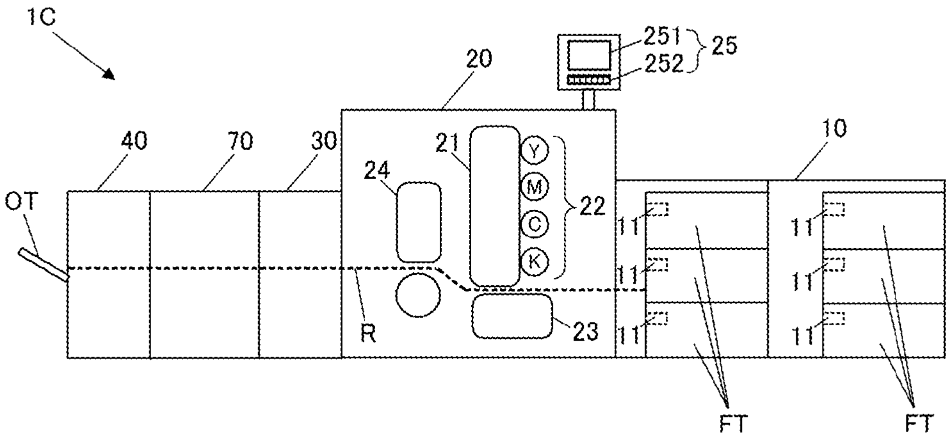
FIG. 12 is a diagram showing a schematic configuration of an image forming system of a second embodiment.

Next, an image forming system 1C of a second embodiment will be described with reference to FIG. 12. Note that the constituent elements same as those of the first embodiment are denoted by the same reference signs, and description thereof will be omitted. FIG. 12 is a diagram showing a schematic configuration of the image forming system 1C of the second embodiment.

As shown in FIG. 12, the image forming system 1C of the second embodiment (hereinafter, simply referred to as the image forming system 1C) includes a sheet feed device 10, an image forming apparatus 20 connected to the rear stage of the sheet feed device 10, a relay unit 30 connected to the rear stage of the image forming apparatus 20, an image inspection device 70 connected to the rear stage of the relay unit 30, and a finisher 40 connected to the rear stage of the image inspection device 70. That is, the image forming system 1C is different from the image forming system 1 of the first embodiment in that the image inspection device 70 is provided.

Figures 13, 14:
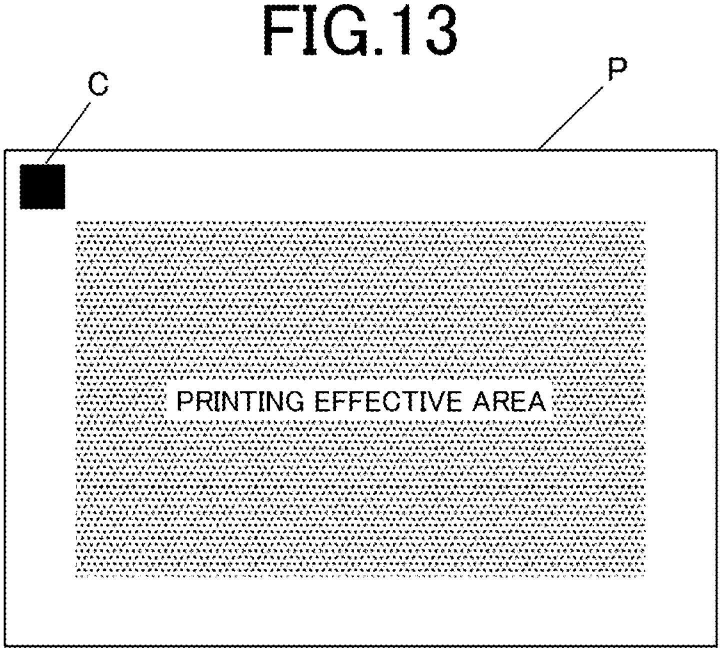
FIG. 13 shows an example of a dedicated chart.
FIG. 14 shows an example of content of a threshold value setting information table.

The image inspection device 70 includes a sensor that optically reads sheets conveyed from the relay unit 30. The image inspection device 70 reads, with the sensor, the image density of a sheet with an image formed, and then conveys the sheet to the subsequent-stage finisher 40. The image density read by the image inspection device 70 is output to the controller 110. As shown in FIG. 13, the image inspection device 70 reads the image density of a common dedicated chart (predetermined chart) C printed, at the time of image forming, outside a printing effective area (effective image region) of a sheet P. Using the common dedicated chart C makes it possible, even if images printed in the printing effective area of sheets before and after switching of sheet feed trays FT are different from one another, to appropriately calculate a difference in image density of the sheets.

As in the first embodiment, the image forming system 1C stores the sheet feed tray information table 121 (shown in FIG. 3) in the storage section 120. The image forming system 1C also stores a threshold value setting information table 123 shown in FIG. 14 in the storage section 120. In the threshold value setting information table 123, threshold values (first threshold value, second threshold value, third threshold value) for the surface electrical resistance and the moisture content, which are the physical property values of sheets, and a threshold value (fourth threshold value) for the image density are recorded.

The image forming apparatus 1C stores, in the storage section 120, a first threshold value setting table 124, a second threshold value setting table 125, a third threshold value setting table 126 and a fourth threshold value setting table 127 shown in FIG. 15A to FIG. respectively. These threshold value setting tables 124, 125, 126, 127 are tables used for setting threshold values (first threshold value, second threshold value, third threshold value, fourth threshold value) in a threshold value setting process (shown in FIG. 22) described below.

2. Description of Operation

Next, operation of the image forming system 1C will be described.

Figure 16:
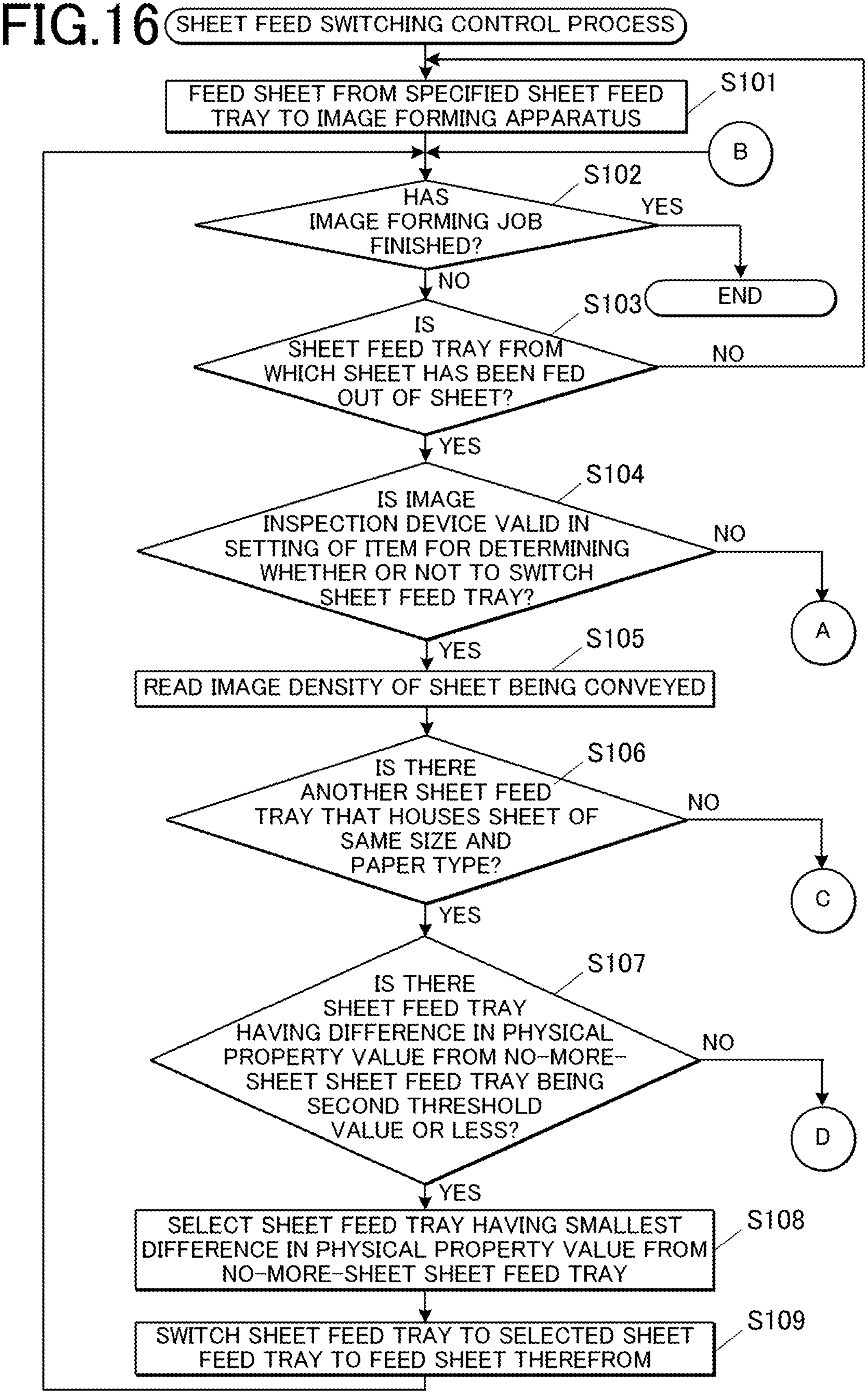
FIG. 16 is a flowchart showing a sheet feed switching control process of the second embodiment.
Figure 17:
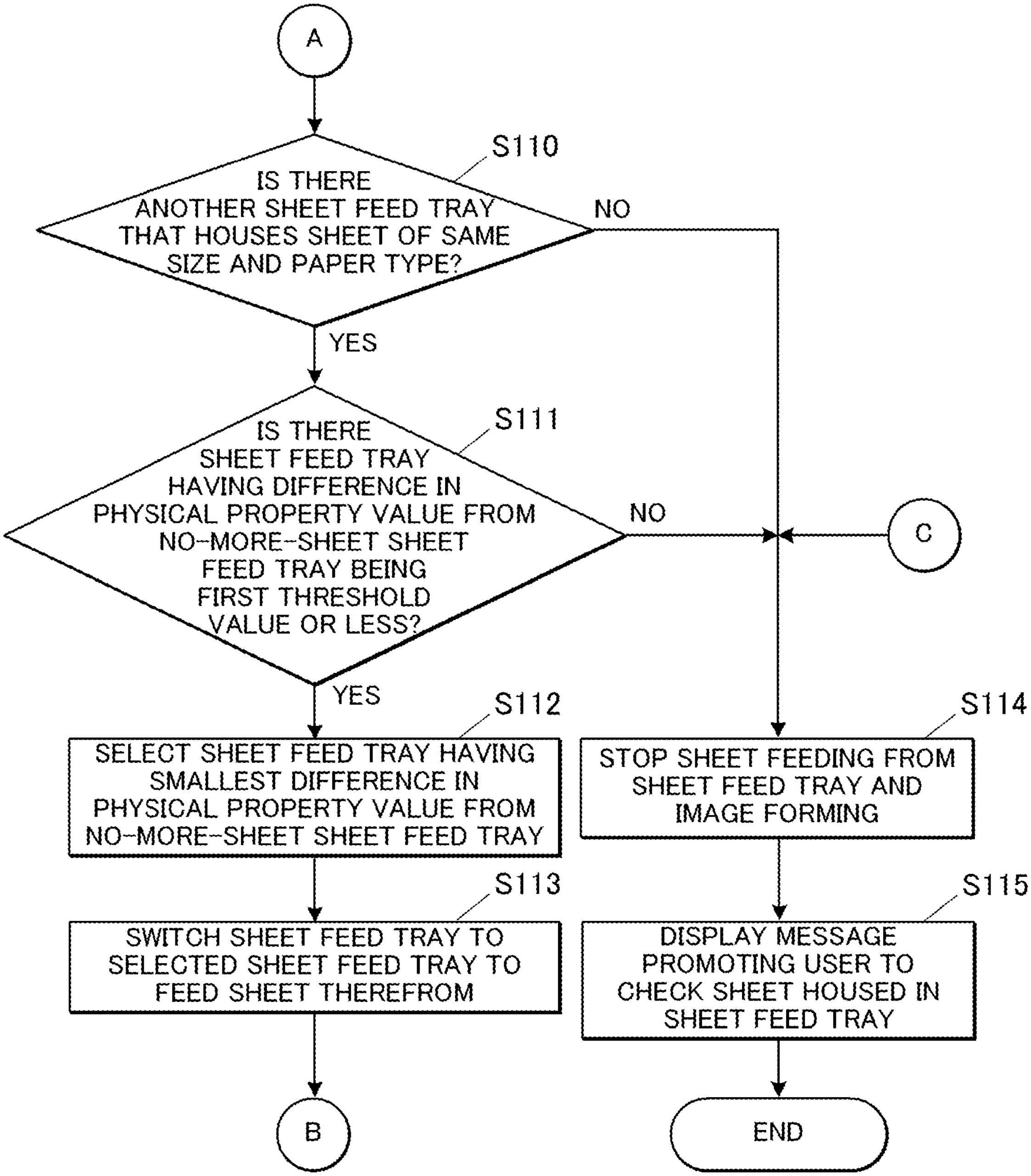
FIG. 17 is a flowchart showing continuation of the sheet feed switching control process shown in FIG. 16.
Figure 18:
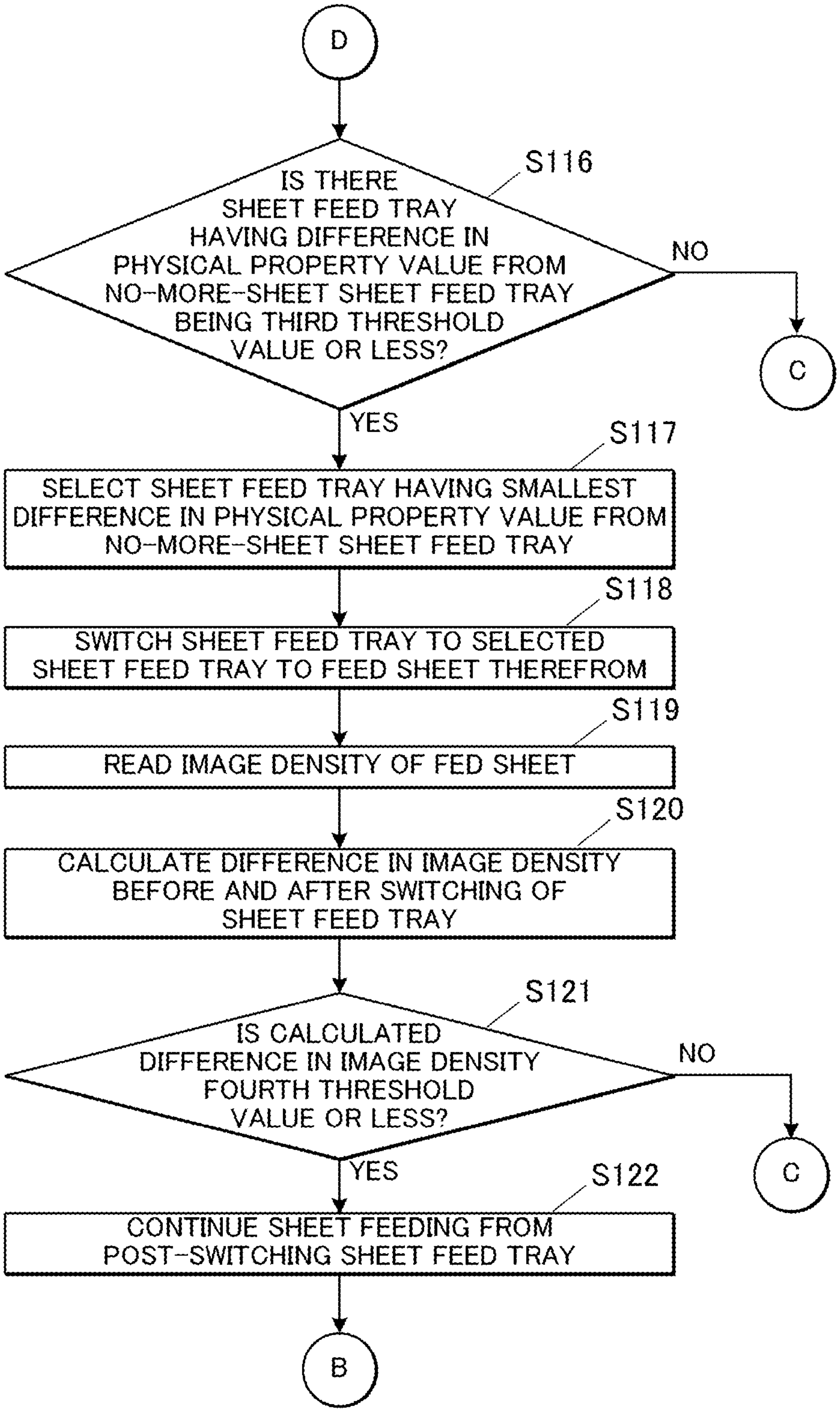
FIG. 18 is a flowchart showing continuation of the sheet feed switching control process shown in FIG. 16.

FIG. 16 to FIG. 18 are flowcharts showing a sheet feed switching control process that is performed by the image forming system 1C. This sheet feed switching control process is started, for example, in response to a command to execute an image forming job being made through the operation part 252.

As shown in FIG. 16, when the sheet feed switching control process is started, first, the controller 110 causes a sheet to be fed from a specified sheet feed tray FT to the image forming apparatus 20 (Step S101).

Next, the controller 110 determines whether or not the image forming job, for which the execution command has been made, has finished (Step S102).

If the controller 110 determines in Step S102 that the image forming job, for which the execution command has been made, has finished (Step S102; YES), the controller 110 ends the sheet feed switching control process.

If the controller 110 determines in Step S102 that the image forming job, for which the execution command has been made, has not finished (Step S102; NO), the controller 110 determines whether or not sheets in the sheet feed tray FT from which the sheet has been fed have run out (Step S103).

If the controller 110 determines in Step S103 that sheets in the sheet feed tray FT, from which the sheet has been fed, have not run out (Step S103; NO), the controller 110 returns the process to Step S101 to repeat Step S101 and the subsequent steps.

If the controller 110 determines in Step S103 that sheets in the sheet feed tray FT, from which the sheet has been fed, have run out (Step S103; YES), the controller 110 determines whether or not the image inspection device 70 is set to "valid" in setting of a sheet feed switching condition (shown in FIG. 21) (Step S104).

If the controller 110 determines in Step S104 that the image inspection device is set to "valid" (Step S104; YES), the controller 110 causes the image inspection device 70 to read the image density of the sheet being conveyed (Step S105). The image inspection device reads the image density of the dedicated chart C (shown in FIG. 13) printed outside the printing area of the sheet being conveyed.

Next, the controller 110 determines whether or not there is another sheet feed tray(s) FT that houses sheets of the same size and paper type, referring to the sheet feed tray information table 121 (shown in FIG. 3) (Step S106).

If the controller 110 determines in Step S106 that there is another sheet feed tray(s) FT that houses sheets of the same size and paper type (Step S106; YES), the controller 110 determines whether or not the sheet feed tray(s) FT that houses sheets of the same size and paper type is/include a sheet feed tray(s) FT having a difference in physical property value (physical property value of a sheet) from the no-more-sheet sheet feed tray FT being the second threshold value or less, referring to the sheet feed tray information table 121 (shown in FIG. 3) and the threshold value setting information table 123 (shown in FIG. 14) (Step S107).

If the controller 110 determines in Step S107 that the sheet feed tray(s) FT that houses sheets of the same size and paper type is/include a sheet feed tray(s) FT having a difference in physical property value from the no-more-sheet sheet feed tray FT being the second threshold value or less (Step S107; YES), the controller 110 selects a sheet feed tray FT having the smallest difference from among the sheet feed tray(s) FT having the difference in physical property value from the no-more-sheet sheet feed tray FT being the second threshold value or less (Step S108).

Next, the controller 110 performs switching to the sheet feed tray FT selected in Step S108, that is, sets the selected sheet feed tray FT as a newly specified sheet feed tray FT, and causes a sheet to be fed from the sheet feed tray FT (Step S109). Then, the controller 110 returns the process to Step S102 to repeat Step S102 and the subsequent steps.

If the controller 110 determines in Step S104 that the image inspection device 70 is set to "invalid" (Step S104; NO), as shown in FIG. 17, the controller 110 determines whether or not there is another sheet feed tray(s) FT that houses sheets of the same size and paper type, referring to the sheet feed tray information table 121 (shown in FIG. 3) (Step S110).

If the controller 110 determines in Step S110 that there is another sheet feed tray(s) FT that houses sheets of the same size and paper type (Step S110; YES), the controller 110 determines whether or not the sheet feed tray(s) FT that houses sheets of the same size and paper type is/include a sheet feed tray(s) FT having a difference in physical property value (physical property value of a sheet) from the no-more-sheet sheet feed tray FT being the first threshold value or less, referring to the sheet feed tray information table 121 (shown in FIG. 3) and the threshold value setting information table 123 (shown in FIG. 14) (Step S111).

If the controller 110 determines in Step S111 that the sheet feed tray(s) FT that houses sheets of the same size and paper type is/include a sheet feed tray(s) FT having a difference in physical property value from the no-more-sheet sheet feed tray FT being the first threshold value or less (Step S111; YES), the controller 110 selects a sheet feed tray FT having the smallest difference from among the sheet feed tray(s) FT having the difference in physical property value from the no-more-sheet sheet feed tray FT being the first threshold value or less (Step S112).

Next, the controller 110 performs switching to the sheet feed tray FT selected in Step S112, that is, sets the selected sheet feed tray FT as a newly specified sheet feed tray FT, and causes a sheet to be fed from the sheet feed tray FT (Step S113). Then, the controller 110 returns the process to Step S102 (shown in FIG. 16) to repeat Step S102 and the subsequent steps.

If the controller 110 determines in Step S107 that the sheet feed tray(s) FT that houses sheets of the same size and paper type is not/do not include a sheet feed tray FT having a difference in physical property value from the no-more-sheet sheet feed tray FT being the second threshold value or less (Step S107; NO), as shown in FIG. 18, the controller 110 determines whether or not the sheet feed tray(s) FT that houses sheets of the same size and paper type is/include a sheet feed tray(s) FT having a difference in physical property value from the no-more-sheet sheet feed tray FT being the third threshold value or less, referring to the sheet feed tray information table 121 (shown in FIG. 3) and the threshold value setting information table 123 (shown in FIG. 14) (Step S116).

If the controller 110 determines in Step S116 that the sheet feed tray(s) FT that houses sheets of the same size and paper type is/include a sheet feed tray(s) FT having a difference in physical property value from the no-more-sheet sheet feed tray FT being the third threshold value or less (Step S116; YES), the controller 110 selects a sheet feed tray FT having the smallest difference from among the sheet feed tray(s) FT having the difference in physical property value (physical property value of a sheet) from the no-more-sheet sheet feed tray FT being the third threshold value or less (Step S117).

Next, the controller 110 performs switching to the sheet feed tray FT selected in Step S117, and causes a sheet to be fed from the sheet feed tray FT (Step S118).

Next, the controller 110 causes the image inspection device 70 to read the image density of the sheet fed in Step S118 (Step S119). The image inspection device 70 reads the image density of the dedicated chart C (shown in FIG. 13) printed outside the printing area of the sheet fed in the Step S118.

Next, the controller 110 calculates a difference in image density before and after switching of the sheet feed trays FT (Step S120). Specifically, the controller 110 calculates an image density difference between the image density of the sheet, which is being conveyed, read in Step S105 (before switching of the sheet feed trays FT) and the image density of the sheet, which is fed in Step S118, read in Step S119 (after switching of the sheet feed trays FT).

Figures 19A, 19B, 19C:
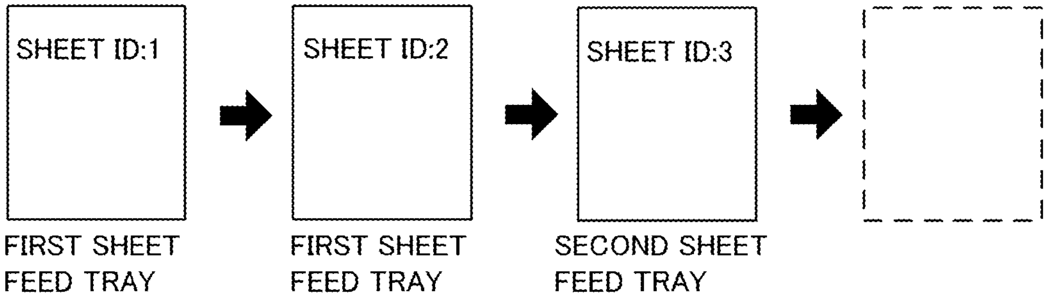
FIG. 19A is an illustration for explaining a method of determining whether or not to continue sheet feeding from a post-switching sheet feed tray.
FIG. 19B is an illustration for explaining the method of determining whether or not to continue sheet feeding from a post-switching sheet feed tray.
FIG. 19C is an illustration for explaining the method of determining whether or not to continue sheet feeding from a post-switching sheet feed tray.

Next, the controller 110 determines whether the image density difference calculated in Step S120 is the fourth threshold value or less, referring to the threshold value setting information table 123 (shown in FIG. 14) (Step S121). For example, in a case, as shown in 19A, where sheets in a first sheet feed tray (sheet feed tray FT) run out during sheet feeding from the first sheet feed tray, and the first sheet feed tray FT is switched to a second sheet feed tray (sheet feed tray FT), if the image density of a sheet (sheet ID: 2) conveyed immediately before switching of sheet feed trays FT is 5.41 and the image density of a sheet (sheet ID: 3) conveyed after switching of sheet feed trays FT is 5.37, the image density difference of these sheets is 0.04 (=5.41−5.37) as shown in 19B. Since the image density difference of these sheets is the fourth threshold value (0.22, shown in FIG. 14) or less, sheet feeding from the second sheet feed tray is continued. On the other hand, if the image density of the sheet (sheet ID: 2) conveyed immediately before switching of sheet feed trays FT is 5.41 and the image density of the sheet (sheet ID: 3) conveyed after switching of sheet feed trays FT is 5.11 as shown in FIG. 19C, the image density difference of these sheets is 0.3 (=5.41−5.11). Since the image density difference of these sheets is more than the fourth threshold value (0.22, shown in FIG. 14), sheet feeding from the second sheet feed tray is stopped.

If the controller 110 determines in Step S121 that the image density difference calculated in Step S120 is the fourth threshold value or less (Step S121; YES), the controller 110 sets the post-switching sheet feed tray FT, to which switching has been performed in Step S118, as a newly specified sheet feed tray FT, and continues sheet feeding from the sheet feed tray FT (Step S122). Then, the controller 110 returns the process to Step S102 (shown in FIG. 16) to repeat Step S102 and the subsequent steps.

If the controller 110 determines in Step S106 that there are no other sheet feed trays FT that house sheets of the same size and paper type (Step S106; NO), the controller 110 stops sheet feeding from the sheet feed tray FT and image forming in the image forming apparatus 20 (Step S114).

If the controller 110 determines in Step S110 that there are no other sheet feed trays FT that house sheets of the same size and paper type (Step S110; NO), the controller 110 stops sheet feeding from the sheet feed tray FT and image forming in the image forming apparatus 20 (Step S114).

If the controller 110 determines in Step S111 that the sheet feed tray(s) FT that houses sheets of the same size and paper type is not/do not include a sheet feed tray FT having a difference in physical property value from the no-more-sheet sheet feed tray FT being the first threshold value or less (Step S111; NO), the controller 110 stops sheet feeding from the sheet feed tray FT and image forming in the image forming apparatus 20 (Step S114).

If the controller 110 determines in Step S116 that the sheet feed tray(s) FT that houses sheets of the same size and paper type is not/do not include a sheet feed tray FT having a difference in physical property value from the no-more-sheet sheet feed tray FT being the third threshold value or less (Step S116; NO), the controller 110 stops sheet feeding from the sheet feed tray FT and image forming in the image forming apparatus 20 (Step S114).

If the controller 110 determines in Step S121 that the image density difference calculated in Step S120 is not the fourth threshold value or less (Step S121; NO), the controller 110 stops sheet feeding from the sheet feed tray FT and image forming in the image forming apparatus 20 (Step S114).

Next, the controller 110 causes the display part 251 to display a message prompting the user to check sheets housed in sheet feed trays FT (Step S115). Then, the controller 110 ends the sheet feed switching control process.

Figure 20:
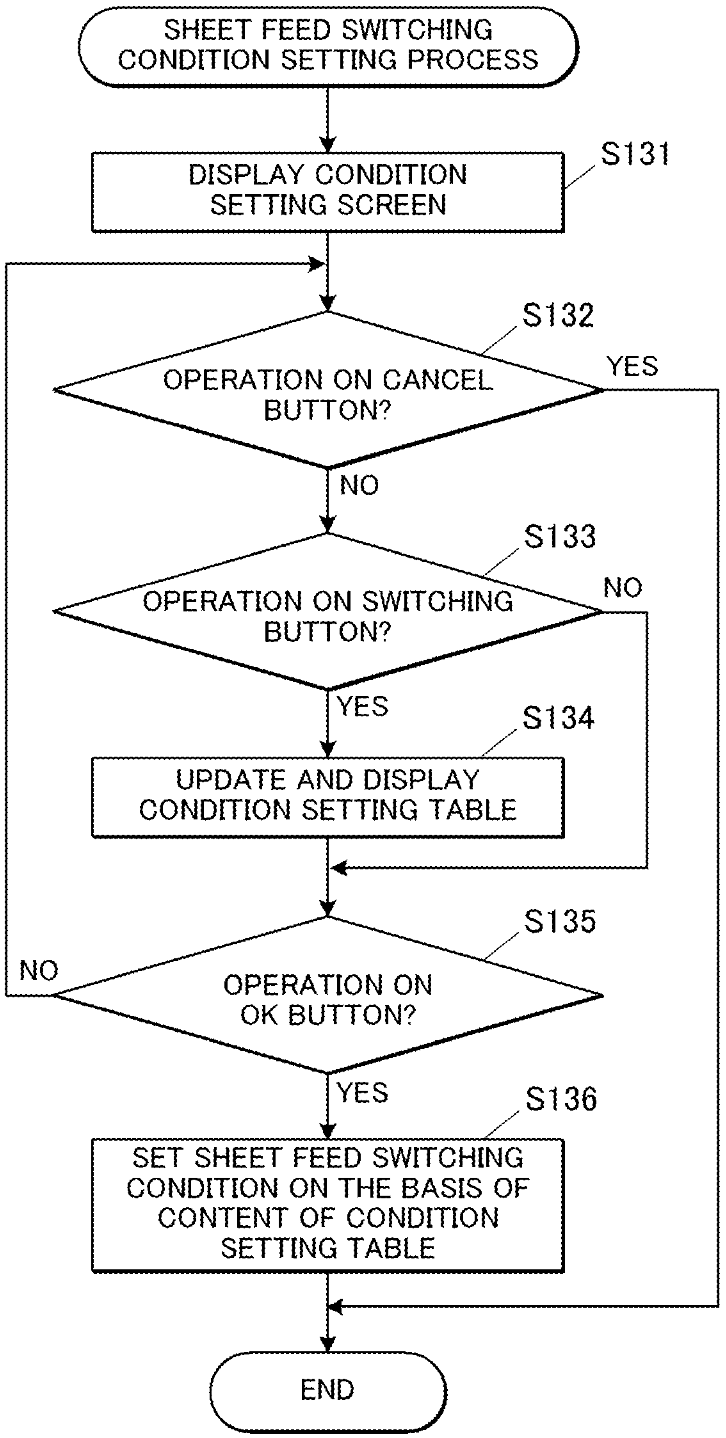
FIG. 20 is a flowchart showing a sheet feed switching condition setting process.

Next, a sheet feed switching condition setting process that is performed by the image forming system 1C will be described with reference to FIG. 20. FIG. 20 is a flowchart showing the sheet feed switching condition setting process. The sheet feed switching condition setting process is started, for example, in response to a command to execute setting of a sheet feed switching condition being made through the operation part 252.

As shown in FIG. 20, when the sheet feed switching condition setting process is started, first, the controller 110 causes the display part 251 to display a condition setting screen 81 (Step S131).

Figure 21:
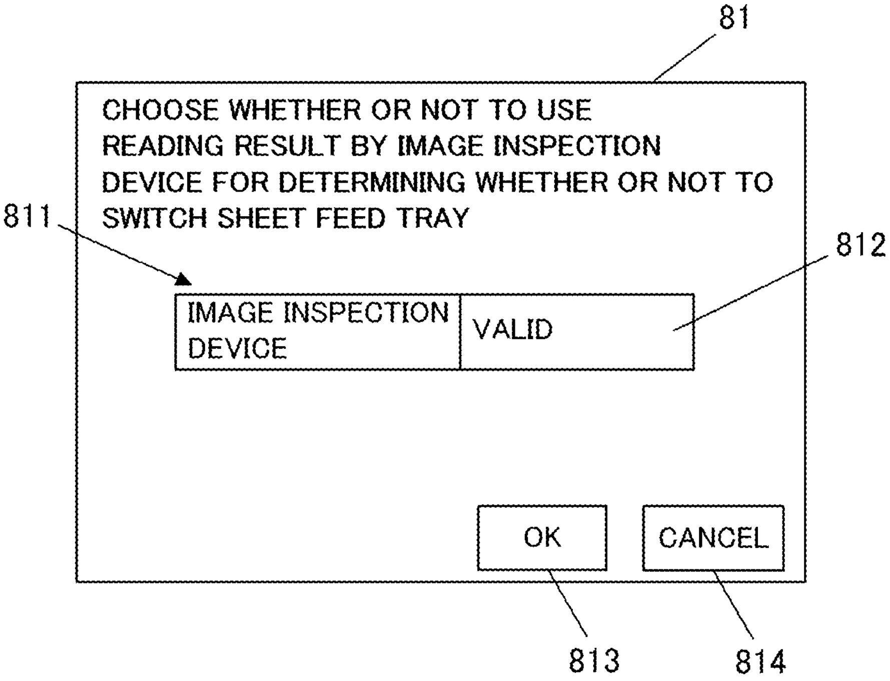
FIG. 21 shows an example of a condition setting screen.

FIG. 21 shows an example of the condition setting screen 81.

As shown in FIG. 21, the condition setting screen 81 is provided with a condition setting table 811, an OK button 813, and a cancel button 814. The condition setting table 811 is a table for setting a sheet feed switching condition(s). In the example shown in FIG. 21, the image inspection device 70 is set to valid, that is, a reading result by the image inspection device 70 is set to be used in sheet feed switching control. In the condition setting table 811, a section where a word "valid" is displayed is a switching button 812. When the switching button 812 with the word "valid" displayed is operated, the "valid" is switched to "invalid", and when the switching button 812 with the word "invalid" displayed is operated, the "invalid" is switched to the "valid". The OK button 813 is a button used for determining (fixing) the sheet feed switching condition with the content displayed in the condition setting table 811. The cancel button 814 is a button used for closing the condition setting screen 81.

Returning to the description of the sheet feed switching condition setting process shown in FIG. 20, the controller 110 determines whether an operation of selecting the cancel button 814 has been made (Step S132).

If the controller 110 determines in Step S132 that an operation of selecting the cancel button 814 has been made (Step S132; YES), the controller 110 ends the sheet feed switching condition setting process.

If the controller 110 determines in Step S132 that an operation of selecting the cancel button 814 has not been made (Step S132; NO), the controller 110 determines whether or not an operation of selecting the switching button 812 has been made (Step S133).

If the controller 110 determines in Step S133 that an operation of selecting the switching button 812 has been made (Step S133; YES), the controller 110 updates the condition setting table 811 and displays the updated one (Step S134). For example, by operating the switching button 812 in the condition setting table 811 shown in FIG. 21, the switching button 812 is updated from "valid" to "invalid" and displayed.

If the controller 110 determines in Step S133 that an operation of selecting the switching button 812 has not been made (Step S133; NO), the controller 110 advances the process to Step S135, skipping Step S134.

Next, the controller 110 determines whether an operation of selecting the OK button 813 has been made (Step S135).

If the controller 110 determines in Step S135 that an operation of selecting the OK button 813 has been made (Step S135; YES), the controller 110 sets the sheet feed switching condition on the basis of the content displayed in the condition setting table 811 (Step S136). Specifically, if the image inspection device 70 being "valid" is displayed in the condition setting table 811, the read result by the image inspection device 70 is set to be used in the sheet feed switching control. On the other hand, if the image inspection device 70 being "invalid" is displayed in the condition setting table 811, the read result by the image inspection device 70 is set not to be used in the sheet feed switching control. Information on the set sheet feed switching condition is stored in the storage section 120. Then, the controller 110 ends the sheet feed switching condition setting process.

If the controller 110 determines in Step S135 that an operation of selecting the OK button 813 has not been made (Step S135; NO), the controller 110 returns the process to Step S132 to repeat Step S132 and subsequent steps.

Figure 22:
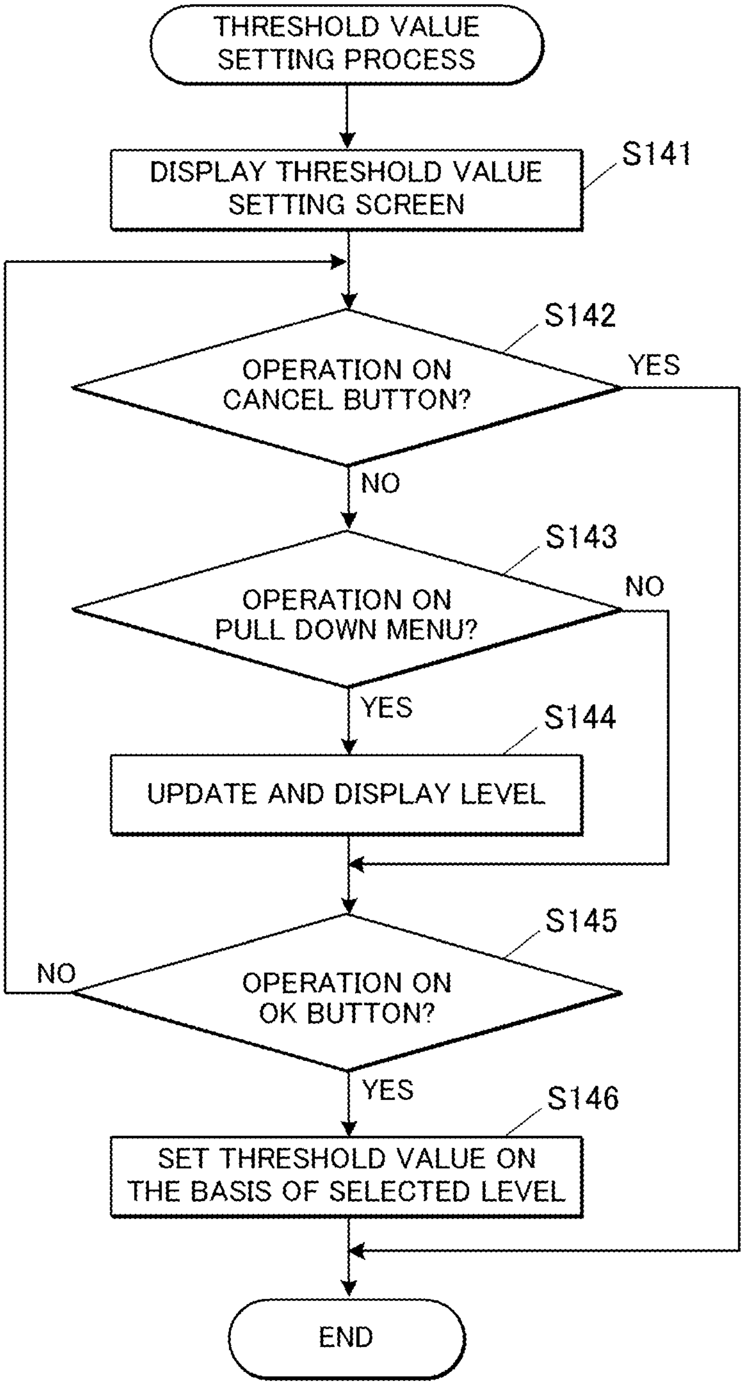
FIG. 22 is a flowchart showing a threshold value setting process.

Next, a threshold value setting process that is performed by the image forming system 1C will be described with reference to FIG. 22. FIG. 22 is a flowchart showing the threshold value setting process. The threshold value setting process is started, for example, in response to a command to execute setting of threshold values (first threshold value, second threshold value, third threshold value, fourth threshold value) being made through the operation part 252.

As shown in FIG. 22, when the threshold value setting process is started, first, the controller 110 causes the display part 251 to display a threshold value setting screen 91 (Step S141).

Figure 23:
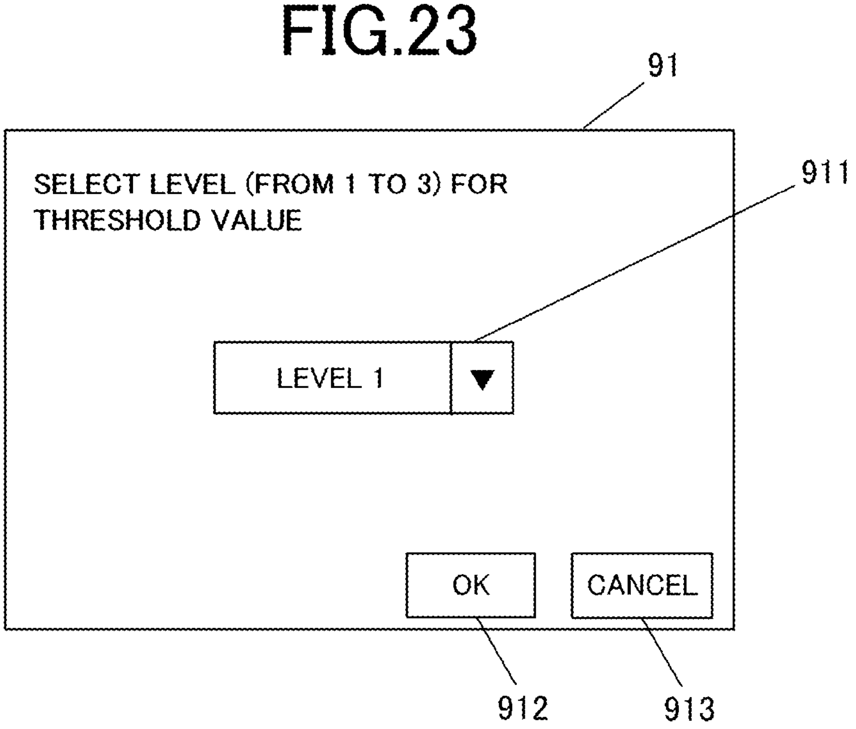
FIG. 23 shows an example of a threshold value setting screen.

FIG. 23 shows an example of the threshold value setting screen 91.

As shown in FIG. 23, the threshold value setting screen 91 is provided with a pull down menu 911, an OK button 912, and a cancel button 913. The pull down menu 911 is a pull down menu for selecting a level (Level 1 to Level 3) for the threshold values to be set. The OK button 912 is a button used for determining (fixing) the level selected with the pull down menu 911, the level for the threshold values to be set. The cancel button 913 is a button used for closing the threshold value setting screen 91.

Returning to the description of the threshold value setting process shown in FIG. 22, the controller 110 determines whether or not an operation of selecting the cancel button 913 has been made (Step S142).

If the controller 110 determines in Step S142 that an operation of selecting the cancel button 913 has been made (Step S142; YES), the controller 110 ends the threshold value setting process.

If the controller 110 determines in Step S142 that an operation of selecting the cancel button 913 has not been made (Step S142; NO), the controller 110 determines whether or not an operation of selecting the pull down menu 911 has been made (Step S143).

If the controller 110 determines in Step S143 that an operation of selecting the pull down menu 911 has been made (Step S143; YES), the controller 110 updates the content (level) of the pull down menu 911 and displays the updated one (Step S144).

If the controller 110 determines in Step S143 that an operation of selecting the pull down menu 911 has not been made (Step S143; NO), the controller 110 advances the process to Step S145, skipping Step S144.

Next, the controller 110 determines whether or not an operation of selecting the OK button 912 has been made (Step S145).

If the controller 110 determines in Step S145 that an operation of selecting the OK button 912 has been made (Step S145; YES), the controller 110 sets the threshold values on the basis of the level selected with the pull down menu 911 (Step S146). Specifically, the controller 110 sets the threshold values corresponding to the level selected with the pull down menu 911, referring to the first threshold value setting table 124, the second threshold value setting table 125, the third threshold value setting table 126 and the fourth threshold value setting table 127. For example, if the level selected with the pull down menu 911 is "Level 2", the first threshold value, the second threshold value and the third threshold value of the surface electrical resistance are set to "15", "15" and "30", respectively, and the fourth threshold value is set to "0.17". The set threshold values are stored in the threshold value setting information table 123 (shown in FIG. 14). Then, the controller 110 ends the threshold value setting process.

If the controller 110 determines in Step S145 that an operation of selecting the OK button 912 has not been made (Step S145; NO), the controller 110 returns the process to Step S142 to repeat Step S142 and the subsequent steps.

3. Advantageous Effects

As described above, the controller 110 of the image forming system 1C selects the second sheet feed tray FT. However, there may be no sheet feed tray FT housing sheets of the same size and type as a sheet(s) formerly housed in the first sheet feed tray FT and having a difference in physical property value from the sheet formerly housed in the first sheet feed tray FT being the second threshold value or less. In such a case, the controller 110 selects, as the second sheet feed tray FT, a sheet feed tray FT having the above-described difference being equal to or less than the third threshold value that is more than the second threshold value, having the smallest difference if there are two or more such sheet feed trays FT, and if a difference between image densities of images formed on sheets before and after switching of the sheet feed trays FT is equal to or less than the fourth threshold value, continues sheet conveyance from the second sheet feed tray FT by causing the conveyance section 50 to convey sheets housed in the second sheet feed tray FT.

Hence, even if the physical property value(s) of the sheets housed in the second sheet feed tray FT is slightly different from the physical property value(s) of the sheet formerly housed in the first sheet feed tray FT, sheet conveyance from the second sheet feed tray FT can be continued as far as image densities of images formed on sheets before and after switching of the sheet feed trays FT are similar. This makes it possible to perform flexible switching control of sheet feed trays FT.

If the difference between image densities of images formed on sheets before and after switching of the sheet feed trays FT is more than the fourth threshold value, the controller 110 of the image forming system 1C stops sheet conveyance from the second sheet feed tray FT, which has been selected as the switching destination. Therefore, it is possible to prevent image densities of images formed on sheets before and after switching of sheet feed trays FT from being different from one another.

The image forming system 1C can set the threshold values (first threshold value, second threshold value, third threshold value, fourth threshold value) corresponding to the level selected by a user operation(s) on the threshold value setting screen 91 (shown in FIG. 23). Therefore, it is possible to increase usability in selection of the second sheet feed tray FT.

The image forming system 1C can choose, on the basis of a user operation(s) on the condition setting screen 81 (shown in FIG. 21), whether or not to use image densities of images formed on sheets before and after switching of the sheet feed trays FT for determining whether to continue or stop sheet conveyance from the second sheet feed tray FT. This makes it possible to perform flexible switching control of sheet feed trays FT.

4. Others

Although the second embodiment to which the present invention is applied has been described above, those described in the above embodiment are not limitations but some of preferred examples of the present invention.

For example, in the above embodiment, the first threshold value, the second threshold value, the third threshold value and the fourth threshold value are set simultaneously on the basis of the level selected by a user operation(s) on the threshold value setting screen 91 (shown in FIG. 23), but the first threshold value, the second threshold value, the third threshold value and the fourth threshold value may be set individually by predetermined user operations.

Further, in the above embodiment, in Step S120 (shown in FIG. 18) of the sheet feed switching control process, the controller 110 calculates the image density difference before and after switching of sheet feed trays FT. However, if switching of sheet feed trays FT is the second or subsequent time, the controller 110 may calculate the image density difference between the image density of an image formed on a sheet housed in the initial sheet feed tray FT and the image density of an image formed on a sheet housed in the latest post-switching sheet feed tray FT.

The invention claimed is:

1. A recording material conveyance apparatus comprising:

a hardware processor that (i) is capable of performing switching control of, in response to, among a plurality of recording material housing sections that house recording materials, a first recording material housing section becoming out of recording material while a recording material fed from the first recording material housing section is being conveyed, selecting a second recording material housing section to cause a recording material housed in the second recording material housing section to be conveyed, and (ii) in the switching control, selects the second recording material housing section based on a physical property value of each of the recording materials of the plurality of recording material housing sections; and a measurement section that measures the physical property value of each of the recording materials of the plurality of recording material housing sections, the physical property value corresponding to a physical property;

wherein the physical property value includes a physical property value corresponding to the physical property that varies depending on an environment of the recording materials.

2. The recording material conveyance apparatus according to claim 1, wherein the hardware processor selects the second recording material housing section based on a first physical property value as the physical property value of the recording material of the first recording material housing section and a second physical property value as the physical property value of the recording material of the second recording material housing section.

3. The recording material conveyance apparatus according to claim 1, wherein the hardware processor selects the second recording material housing section based on a difference between a first physical property value as the physical property value of the recording material of the first recording material housing section and a second physical property value as the physical property value of the recording material of the second recording material housing section.

4. The recording material conveyance apparatus according to claim 1, wherein in the switching control, the hardware processor selects the second recording material housing section based on the physical property value associated with, among the plurality of recording material housing sections, a recording material housing section housing a recording material of a same size and a same type as the recording material of the first recording material housing section.

5. The recording material conveyance apparatus according to claim 1, wherein the hardware processor selects, from among the plurality of recording material housing sections, a recording material housing section having a difference in physical property value from the first recording material housing section being a first threshold value or less, as the second recording material housing section.

6. The recording material conveyance apparatus according to claim 5, wherein in the switching control, the hardware processor does not select the second recording material housing section and stops recording-material conveyance by a recording material conveyance section in response to no recording material housing section housing a recording material of a same size and a same type as the recording material of the first recording material housing section and having the difference in physical property value from the first recording material housing section being the first threshold value or less being present.

7. The recording material conveyance apparatus according to claim 6, wherein the hardware processor causes a display part to display information indicating that the recording materials housed in the plurality of recording material housing sections are to be checked, in response to stopping the recording-material conveyance by the recording material conveyance section.

8. The recording material conveyance apparatus according to claim 5, further comprising a first receiving section that receives a user operation to set or change the first threshold value.

9. The recording material conveyance apparatus according to claim 1, wherein the hardware processor selects, from among the plurality of recording material housing sections, a recording material housing section having a smallest difference in physical property value from the first recording material housing section, as the second recording material housing section.

10. The recording material conveyance apparatus according to claim 1, further comprising, on a recording-material conveyance path:

an image forming apparatus that forms images on the recording materials; and an image inspection device that inspects the images formed on the recording materials, wherein the image inspection device reads image densities of the images formed on the recording materials before and after switching of the first recording material housing section to the second recording material housing section in the switching control, and wherein the hardware processor is capable of determining whether to continue or stop recording-material conveyance by a recording material conveyance section based on the image densities of the images formed on the recording materials before and after the switching.

11. The recording material conveyance apparatus according to claim 10, wherein in the switching control, the hardware processor selects a recording material housing section housing a recording material of a same size and a same type as the recording material of the first recording material housing section and having a difference in physical property value from the first recording material housing section being a second threshold value or less and being smallest, as the second recording material housing section, and continues the recording-material conveyance by the recording material convenance section by causing the recording material conveyance section to convey the recording material housed in the second recording material housing section.

12. The recording material conveyance apparatus according to claim 11, wherein in the switching control, the hardware processor in response to no recording material housing section housing the recording material of the same size and the same type as the recording material of the first recording material housing section and having the difference in physical property value from the first recording material housing section being the second threshold value or less being present, selects a recording material housing section housing the recording material of the same size and the same type as the recording material of the first recording material housing section and having the difference being equal to or less than a third threshold value that is more than the second threshold value and being smallest, as the second recording material housing section, and in response to a difference between the image densities of the images formed on the recording materials before and after the switching being a fourth threshold value or less, continues the recording-material conveyance by the recording material conveyance section by causing the recording material conveyance section to convey the recording material housed in the second recording material housing section.

13. The recording material conveyance apparatus according to claim 12, wherein the hardware processor stops the recording-material conveyance by the recording material conveyance section in response to the difference between the image densities of the images formed on the recording materials before and after the switching being more than the fourth threshold value.

14. The recording material conveyance apparatus according to claim 12, wherein in the switching control, the hardware processor does not select the second recording material housing section and stops the recording-material conveyance by the recording material conveyance section in response to no recording material housing section housing the recording material of the same size and the same type as the recording material of the first recording material housing section and having the difference being the third threshold value or less being present.

15. The recording material conveyance apparatus according to claim 12, further comprising a third receiving section that receives a user operation to set or change at least one of the second threshold value, the third threshold value and the fourth threshold value.

16. The recording material conveyance apparatus according to claim 10, further comprising a fourth receiving section that receives a user operation to choose whether or not to use the image densities of the images formed on the recording materials before and after the switching for the hardware processor to determine whether to continue or stop the recording-material conveyance by the recording material conveyance section.

17. The recording material conveyance apparatus according to claim 10, wherein the image inspection device reads the image densities of the images formed on the recording materials, based on a predetermined chart formed outside an effective image region on each of the recording materials.

18. The recording material conveyance apparatus according to claim 1, wherein the measurement section is disposed at each of the plurality of recording material housing sections.

19. The recording material conveyance apparatus according to claim 1, wherein the measurement section is disposed on a recording-material conveyance path.

20. The recording material conveyance apparatus according to claim 1, wherein the measurement section is externally attached.

21. An image forming system comprising:

an image forming apparatus that forms images on the recording materials; and the recording material conveyance apparatus according to claim 1.

22. A recording material conveyance apparatus comprising:

a hardware processor that (i) is capable of performing switching control of, in response to, among a plurality of recording material housing sections that house recording materials, a first recording material housing section becoming out of recording material while a recording material fed from the first recording material housing section is being conveyed, selecting a second recording material housing section to cause a recording material housed in the second recording material housing section to be conveyed, and (ii) in the switching control, selects the second recording material housing section based on a physical property value of each of the recording materials of the plurality of recording material housing sections; and a measurement section that measures the physical property value of each of the recording materials of the plurality of recording material housing sections, the physical property value corresponding to a physical property;

wherein the hardware processor selects the second recording material housing section based on a first physical property value as the physical property value of the recording material of the first recording material housing section and a second physical property value as the physical property value of the recording material of the second recording material housing section; and wherein the first physical property value is a physical property value stored in advance in a storage section in association with the first recording material housing section.

23. The recording material conveyance apparatus according to claim 22, wherein the physical property value includes a physical property value corresponding to the physical property that varies depending on an environment of the recording materials.

24. The recording material conveyance apparatus according to claim 4, wherein the physical property includes at least one of surface electrical resistance and moisture content of the recording materials.

25. The recording material conveyance apparatus according to claim 4, further comprising a second receiving section that receives a user operation to select at least one item from among a plurality of items corresponding to a plurality of physical properties, each of which is the physical property, including surface electrical resistance and moisture content of the recording materials, wherein the hardware processor uses the physical property value of the at least one item selected by the user operation to select the second recording material housing section.

26. A recording material conveyance method comprising:

performing switching control of, in response to, among a plurality of recording material housing sections that house recording materials, a first recording material housing section becoming out of recording material while a recording material fed from the first recording material housing section is being conveyed, selecting a second recording material housing section to cause a recording material housed in the second recording material housing section to be conveyed; and measuring a physical property value of each of the recording materials of the plurality of recording material housing sections, the physical property value corresponding to a physical property, wherein the switching control includes selecting the second recording material housing section based on the measured physical property value of each of the recording materials of the plurality of recording material housing sections;

wherein the physical property value includes a physical property value corresponding to the physical property that varies depending on an environment of the recording materials.

27. A non-transitory computer-readable storage medium storing a program that causes a recording material conveyance apparatus to:

perform switching control of, in response to, among a plurality of recording material housing sections that house recording materials, a first recording material housing section becoming out of recording material while a recording material fed from the first recording material housing section is being conveyed, selecting a second recording material housing section to cause a recording material housed in the second recording material housing section to be conveyed; and measure a physical property value of each of the recording materials of the plurality of recording material housing sections, the physical property value corresponding to a physical property, wherein the switching control includes selecting the second recording material housing section based on the measured physical property value of each of the recording materials of the plurality of recording material housing sections;

wherein the physical property value includes a physical property value corresponding to the physical property that varies depending on an environment of the recording materials.

* * * * *